| (12) United States Patent<br>Al-Hatef | (10) Patent No.: US 12,499,757 B2<br>(45) Date of Patent: Dec. 16, 2025 |
|---|---|

(54) METHOD FOR MANAGING OPERATION OF A TRAFFIC SIGNAL TERMINAL BASED ON TRAFFIC FLOW OF VEHICLES IN THE PROXIMITY OF THE TRAFFIC SIGNAL TERMINAL

(71) Applicant: MOHAMMED AL-MANA COLLEGE FOR MEDICAL SCIENCES, Dammam (SA)

(72) Inventor: Ebrahim Ahmed Jaber Al-Hatef, Dammam (SA)

(73) Assignee: MOHAMMED AL-MANA COLLEGE FOR MEDICAL SCIENCES, Dammam (SA)

( * ) Notice: Subject to any disclaimer, the term of this patent is extended or adjusted under 35 U.S.C. 154(b) by 102 days.

(21) Appl. No.: 18/649,461

(22) Filed: Apr. 29, 2024

(65) Prior Publication Data

US 2025/0336289 A1 Oct. 30, 2025

(51) Int. Cl.
*G08G 1/08* (2006.01)
*G06V 10/82* (2022.01)
*G06V 20/52* (2022.01)
*G08G 1/01* (2006.01)

(52) U.S. Cl.
CPC ............... *G08G 1/08* (2013.01); *G06V 10/82* (2022.01); *G06V 20/52* (2022.01); *G08G 1/0116* (2013.01); *G08G 1/0145* (2013.01); *G06V 2201/08* (2022.01)

(58) Field of Classification Search
CPC ...... G08G 1/08; G08G 1/0116; G08G 1/0145; G06V 10/82; G06V 20/52; G06V 2201/08
See application file for complete search history.

(56) References Cited

U.S. PATENT DOCUMENTS

| 10,600,319 | B1 * | 3/2020 | Shuff ................ G08G 1/0116 |
| 2009/0167561 | A1 * | 7/2009 | Liang ................ G08G 1/095 340/907 |
| 2018/0174449 | A1 | 6/2018 | Nguyen |
| 2018/0211523 | A1 | 7/2018 | Ashida et al. |
| 2019/0043348 | A1 | 2/2019 | Eno et al. |
| 2021/0020036 | A1 | 1/2021 | Adetiloye |
| 2023/0024838 | A1 | 1/2023 | Kim |

* cited by examiner

*Primary Examiner* — Davetta W Goins
*Assistant Examiner* — Sharmin Akhter
(74) *Attorney, Agent, or Firm* — Oblon, McClelland, Maier & Neustadt, L.L.P.

(57) ABSTRACT

A method for managing operation of a traffic signal terminal based on traffic flow of vehicles in the proximity of the traffic signal terminal includes obtaining real-time vehicle data from a vehicle detection sensor unit. The method also includes determining, based on the real-time vehicle data, lane data associated with each traffic signal terminal of a set of traffic signal terminals. The method also includes obtaining, from a data storage system, traffic flow data that is indicative of traffic flow between the traffic signal terminals at various time intervals. The method also includes generating a first traffic signal message based on the lane data and the traffic flow data. The method also includes transmitting the first traffic signal message to the first traffic signal terminal to cause the first traffic signal terminal to display the first traffic signal message.

19 Claims, 16 Drawing Sheets

METHOD FOR MANAGING OPERATION OF A TRAFFIC SIGNAL TERMINAL BASED ON TRAFFIC FLOW OF VEHICLES IN THE PROXIMITY OF THE TRAFFIC SIGNAL TERMINAL

BACKGROUND

Technical Field

The present disclosure is directed to a method for managing the operation of a traffic signal terminal based on the traffic flow of vehicles in the proximity of the traffic signal terminal.

Description of Related Art

The "background" description provided herein is for the purpose of generally presenting the context of the disclosure. Work of the presently named inventors, to the extent it is described in this background section, and aspects of the description which may not otherwise qualify as prior art at the time of filing, are neither expressly nor impliedly admitted as prior art against the present invention.

Traffic congestion has become one of the most common problems around the world, especially in big cities. It is considered one of the biggest problems leading to the inability of road cars to pass the signal at the appropriate speed, or without exposure to the risks of accidents. Conventional traffic light control systems control the opening and closing of traffic lights in one or all directions in a pre-programmed timed manner. Also, the problem of traffic congestion is increasing in severity day by day in most well-populated cities. Some auxiliary causes affect, directly or indirectly, the creation and creation of congestion, more clearly suffocation at peak time, such as engineering causes, that could be related to either the road network, its size, or its ability to absorb and discharge the volume of daily traffic. Additionally, the presence of consecutive traffic lights in the same lane or a branched path with crowded traffic and behavioral causes such as not following the principles and traffic laws regulating traffic could also cause havoc. Controlling traffic to obtain the highest efficiency in traffic is important, and traffic lights are the first means of controlling traffic. However, the current traffic lights can only maintain the specified lights, while traffic jams can easily occur due to the inability to adjust the traffic lights when the rush hour traffic volume is relatively large. The traffic lights, on the other hand, are made so that they can change based on the traffic demands. In most places, the changes are automatic and run for a set number of seconds or minutes, where there are different amounts of traffic intensity on intersecting roads, the light can be arranged so that the green signal lasts longer on the busiest road. Some lights can also be arranged so that the same traffic makes those signals change. This is done by placing switches or magnetic bars on paved roads. These means are called detectors as cars pass over the detectors, the light changes to allow cars to cross the intersection. To control pedestrian traffic across a busy street, special signals are made from an electric switch operated by pedestrians.

One of the important features of traffic lights is the control operations of opening or preparing and closing traffic. Therefore, the process of controlling traffic is still limited to the above-mentioned actions, whether it is preprogrammed or automated, and here the problem still exists. The control of identifying which signal or lane or even changing the lane direction based on the analyzed flow of vehicles in a single lane or signal or street or city or even state is not presented, as well as taking the same action or different action with the next traffic lights or next to the next and so on, on advance is not presented as well. Moreover, predicting the arrival of vehicles to different signals and sending them automated actions if required to slow down the speed or stop or change directions to clear other signals is missing.

Further, the traffic light itself is preferably limited to a few types such as vertical or horizontal or three colors (red, yellow, and green) display in traditional traffic signal display screens, alternately a pre-defined arrow within each circle with an assigned direction (Street straight, Right, Left, U-Turn) or number inside the circle in few digital displays. Hence, such traffic lights are preferably limited to pre-defined options and cannot use the same circle or spot to display different directions for the lane based on the output sent to the signal, such as showing left direction if the pre-defined direction is right and so on. At the same time it cannot display combination of instructions for example to slow a particular lane to specific speed and stop another lane temporarily and change the direction for another lane in the same road.

Most of the currently known techniques for regulating traffic target a given vehicle in arriving at a predetermined destination and opening the light signal, which involves just opening the traffic light regardless of the past situation for the previous traffic light or previous previous traffic light or previous previous previous . . . etc in the network, or the current or future situation of the next traffic light or next next traffic light or next next next traffic in the network, which may cause indirect traffic jams in any area and the control is based on opening and closing alone in such systems. On the other hand, some other techniques give priority to open traffic lights to limited vehicles such as ambulances where the required route is known in advance, school buses, or any car with a pre-fixed global positioning system (GPS), or any Wi-Fi device or radar-based target detection. The decision is only for opening the traffic light and it will be carried out once the vehicles near the signal and traffic light receive the command. There is still a problem with being restricted to the route already programmed. So once the vehicles change lanes for whatever reason or if there is a restriction to only opening the signal once the vehicles are near the signal, there is a chance that the next related signal does not open till the vehicles reach the wireless communication point. Moreover, known techniques also lack the identification or choosing the priority action (open, stop, change lane, etc.) for specific signal/signals or lane/lanes with the combination of slowing the speed, forcing lane change, clearing other signals or lanes in connected route for a signal or groups of signals at a specific intersection or several consecutive intersections at the same time or at a different time based on the flow of the cars and predictive flow.

Each of the aforementioned prior art suffers from one or more drawbacks hindering their adoption. Accordingly, it is one object of the present disclosure to provide a method for managing the operation of a traffic signal terminal based on the traffic flow of vehicles in the proximity of the traffic signal terminal.

SUMMARY

In an exemplary embodiment, a method for managing the operation of a traffic signal terminal based on the traffic flow of vehicles in the proximity of the traffic signal terminal is described. The method includes obtaining real-time vehicle data from a vehicle detection sensor unite using object detection algorithm. The method also includes real time vehicle classification. The method also includes determining, based on the real-time vehicle data, lane data associated with each traffic signal terminal of a set of traffic signal terminals. The lane data includes an effective number of vehicles at a traffic signal terminal on a lane or an effective number of expected vehicles will reach a traffic signal terminal in a network (this is in case of next signals in connected direction) or an effective number of expected vehicles going to reach a traffic signal terminal in a network (this is in case of out put from previous signals in connected direction). The lane data also includes lane fill data that is indicative of a percentage of a lane occupied by vehicles at a location where a traffic signal terminal of the set of traffic signal terminals is installed or expected lane fill data for the next traffic signal in a network (this is in case of next signals in connected direction) or expected lane fill data from previous traffic signal in a network (this is in case of output from previous signals in connected direction). The lane data also includes lane fill rate which is indicative of the rate at which the lane is filled with vehicles also the expected lane fill rate and previous lane fill rate from previous signals. The lane data also includes vehicle priority data that is indicative of whether a vehicle is a priority vehicle. The lane data is obtained for each lane in same direction at the location or coming from any connected location in a network or will reach other connected location in a network. The set of traffic signal terminals includes a first traffic signal terminal of multiple traffic signal terminals in a traffic grid and related traffic signal terminals, which correspond to those of the traffic signal terminals related to the first traffic signal terminal. The method also includes obtaining, from a data storage system, traffic flow data that is indicative of traffic flow between the traffic signal terminals at various time intervals. The method also includes generating a first traffic signal message based on the lane data and the traffic flow data. The first traffic signal message includes for each lane, lane speed data that is indicative of a speed limit to be followed in the lane, lane direction data that is indicative of a direction in which vehicular traffic on the lane has to move, or lane traffic signal color. The method also includes transmitting the first traffic signal message to the first traffic signal terminal or multiple traffic signal terminals to cause the first traffic signal terminal or multiple traffic signal terminals to display the first traffic signal message or displays the same first traffic signal message or another message than first traffic signal message at the same time or sequential order or semi sequential order.

In another exemplary embodiment, a method for managing the operation of a traffic signal terminal based on the traffic flow of vehicles in the proximity of the traffic signal terminal is described. The method includes obtaining training data for training a machine learning (ML) model to generate a traffic signal message for transmission to a first traffic signal terminal of multiple traffic signal terminals in a traffic grid. Obtaining the training data includes determining, based on real-time vehicle data input obtained from a vehicle detection sensor unit, lane data associated with each traffic signal terminal of a set of traffic signal terminals. The lane data includes lane fill data that is indicative of a percentage of a lane occupied by vehicles at a location where a traffic signal terminal of the set of traffic signal terminals is installed, and lane fill rate that is indicative of a rate at which the lane is filled with vehicles. The lane data is obtained for each lane of multiple lanes at the location, the set of traffic signal terminals includes the first traffic signal terminal and related traffic signal terminals, which correspond to those of the traffic signal terminals related to the first traffic signal terminal. The method also includes obtaining, from a data storage system, traffic flow data that is indicative of traffic flow between the traffic signal terminals at various time intervals. The method also includes training the ML model with the training data to generate the traffic signal message. The traffic signal message includes, for each lane, lane speed data that is indicative of a speed limit to be followed on the lane, lane direction data that is indicative of a direction in which vehicular traffic on the lane has to move, or lane traffic signal color.

In another exemplary embodiment, a non-transitory computer-readable storage medium for storing computer-readable instructions that, when executed by a computer, cause the computer to perform a method is described. The method includes determining lane data associated with each traffic signal terminal of a set of traffic signal terminals. The lane data includes lane fill data that is indicative of a percentage of a lane occupied by vehicles at a location where a traffic signal terminal of the set of traffic signal terminals is installed, and lane fill rate that is indicative of a rate at which the lane is filled with vehicles. The lane data is obtained for each lane of multiple lanes at the location, and the set of traffic signal terminals includes a first traffic signal terminal of multiple traffic signal terminals in a traffic grid and those of the traffic signal terminals related to the first traffic signal terminal. The method also includes obtaining, from a data storage system, traffic flow data that is indicative of traffic flow between the traffic signal terminals at various times. The method also includes generating, based on the lane data and the traffic flow data, a traffic signal message for the first traffic signal terminal. The traffic signal message includes, for each lane, lane speed data that is indicative of a speed limit to be followed in the lane, lane direction data that is indicative of a direction in which vehicular traffic on the lane has to move, or lane traffic signal color. The method also includes transmitting the traffic signal message to one or more of the previous/next/previous or next/previous and next traffic signal terminals simultaneously or sequentially to cause the traffic signal terminal to display the traffic signal message.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
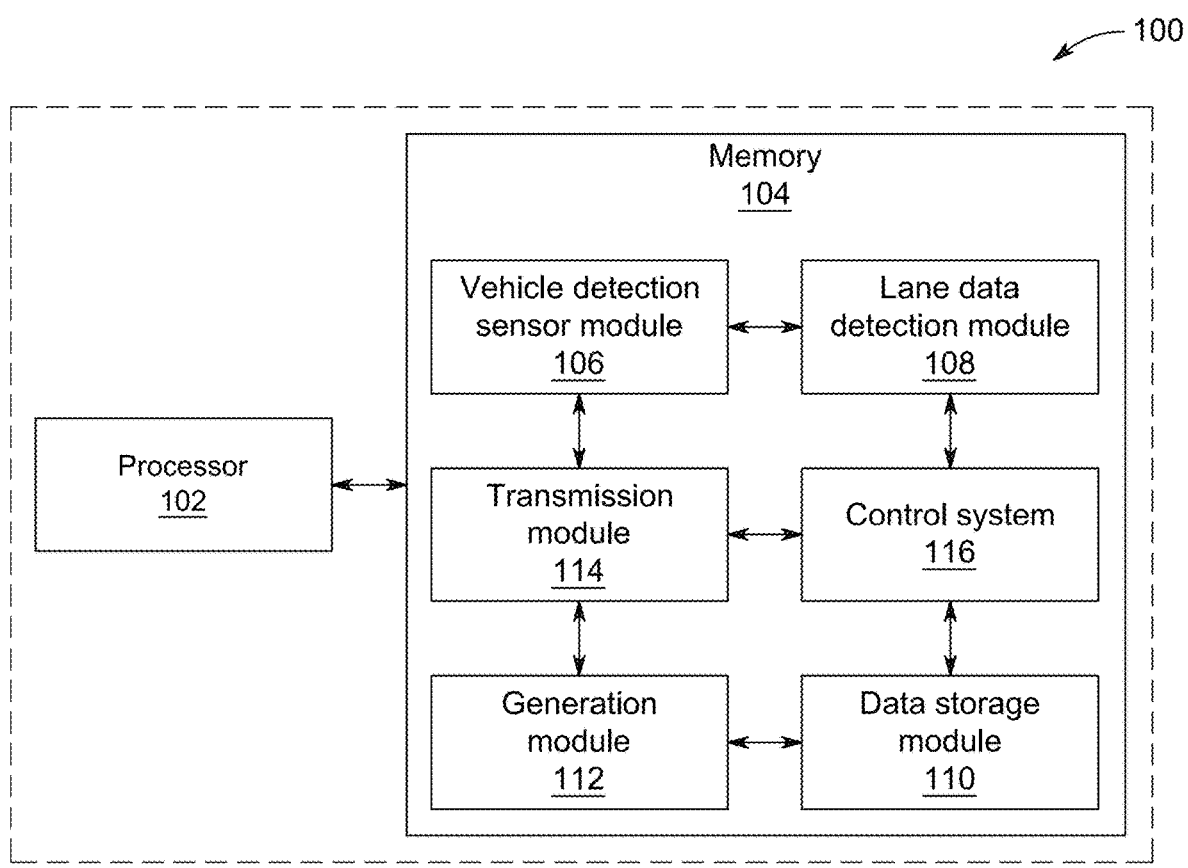
FIG. 1A depicts a system for managing the operation of a traffic signal terminal based on the traffic flow of vehicles in the proximity of the traffic signal terminal, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about" and similar terms generally refer to ranges that include the identified value within a margin of 20%, 10%, or preferably 5%, and any values therebetween.

Various embodiments of the present technology provide a method and a system for controlling traffic lights using control action of the signal light by identifying a particular light signal or several light signals in consecutive signals and giving priority to open, close, divert, change the lane, or slow vehicles with the speed limit or change the lane if required in the appropriate direction based on the number of cars within the lanes or entering the lane or approaching another traffic signal in advance.

FIG. 1A depicts a system architecture diagram 100 for managing the operation of a traffic signal terminal based on the traffic flow of vehicles in the proximity of the traffic signal terminal, according to certain embodiments. The system 100 includes a memory 104 including one or more executable modules and a processor 102 configured to execute the one or more executable modules. The executable modules include vehicle detection sensor module 106, lane data detection module 108, data storage module 110, generation module 112 and transmission module 114. The vehicle detection sensor module 106 is configured for obtaining real-time vehicle data. The lane data detection module 108 is configured for determining lane data associated with each traffic signal terminal of a set of traffic signal terminals. The lane data includes lane fill data that is indicative of a percentage of a lane occupied by vehicles at a location where a traffic signal terminal of the set of traffic signal terminals is installed, and lane fill rate that is indicative of a rate at which the lane is filled with vehicles. The lane data is obtained for each lane of multiple lanes at the location. The set of traffic signal terminals includes a first traffic signal terminal of multiple traffic signal terminals in a traffic grid and those of the traffic signal terminals related to the first traffic signal terminal.

The data storage module 110 is configured for obtaining, from a data storage system, traffic flow data that is indicative of traffic flow between the traffic signal terminals at various times. The generation module 112 is configured for generating, based on the lane data and the traffic flow data, a traffic signal message for the first traffic signal terminal. The traffic signal message includes, for each lane, a lane speed data that is indicative of a speed limit to be followed in the lane, lane direction data that is indicative of a direction in which vehicular traffic on the lane has to move, or lane traffic signal color. The transmission module 114 is configured for transmitting the traffic signal message to the first traffic signal terminal to cause the first traffic signal terminal to display the traffic signal message.

The system 100 further includes a control system 116 for controlling traffic lights using control action of the signal light. In some implementations, the control system 116 includes a machine learning unit 125 for training a machine learning (ML) model to generate predicted traffic signal messages. The training data for training the ML model includes lane data associated with the set of traffic signal terminals, and the traffic flow data associated with the traffic grid. In an implementation, the ML model uses a cost function that is indicative of a reward assigned to the first ML model based on a wait time of the vehicular traffic at the first traffic signal terminal. In an implementation, the cost function includes an additional reward that is assigned to the ML model for reducing the wait time of a priority vehicle. In an implementation, the additional reward assigned for the ML model is greater than the reward awarded for reducing the wait time of a non-priority vehicle. In an implementation, the ML model is iteratively trained to increase the cost function. In some implementations, the lane data or the traffic flow data is determined after a specified time interval, and a second traffic signal message is generated after the specified time interval, such that the lane direction data in the second traffic signal message is indicative of a second direction in which the vehicular traffic on the lane has to move, where the second direction is different from the direction indicated in the first traffic signal message.

In some embodiments, the control system 116 generates a representation of the traffic grid as a directed graph of nodes and links, where each of the nodes represents a specified traffic signal terminal of the traffic grid and where each of the links between a pair of nodes represents (a) a path for traffic flow between traffic signal terminals corresponding to the pair of nodes and (b) a direction of the traffic flow. The control system 116 determines a link strength for each of the links between the nodes corresponding to the set of traffic signal terminals, where the link strength is indicative of the effective number of vehicles passing between two traffic signal terminals and determines the centrality of each of the nodes corresponding to the set of traffic signal terminals based on the link strength, where the centrality is indicative of a weight associated with each of the nodes. The control system 116 inputs the link strength and the centrality associated with the set of traffic signal terminals as part of training data to a first ML model to generate predicted traffic signal messages. Further, the control system 116 generates the first traffic signal message based on an event, such that the event includes the expiry of a time interval, the wait time of a priority vehicle at the first traffic signal terminal, or a related traffic signal terminal exceeding a first specified time limit, wait time of any of the vehicles at the first traffic signal terminal or the related traffic signal terminal exceeding a second specified time limit, or lane fill data associated with first traffic signal terminal or the related traffic signal terminal exceeding a specified threshold limit.

Figure 1B:
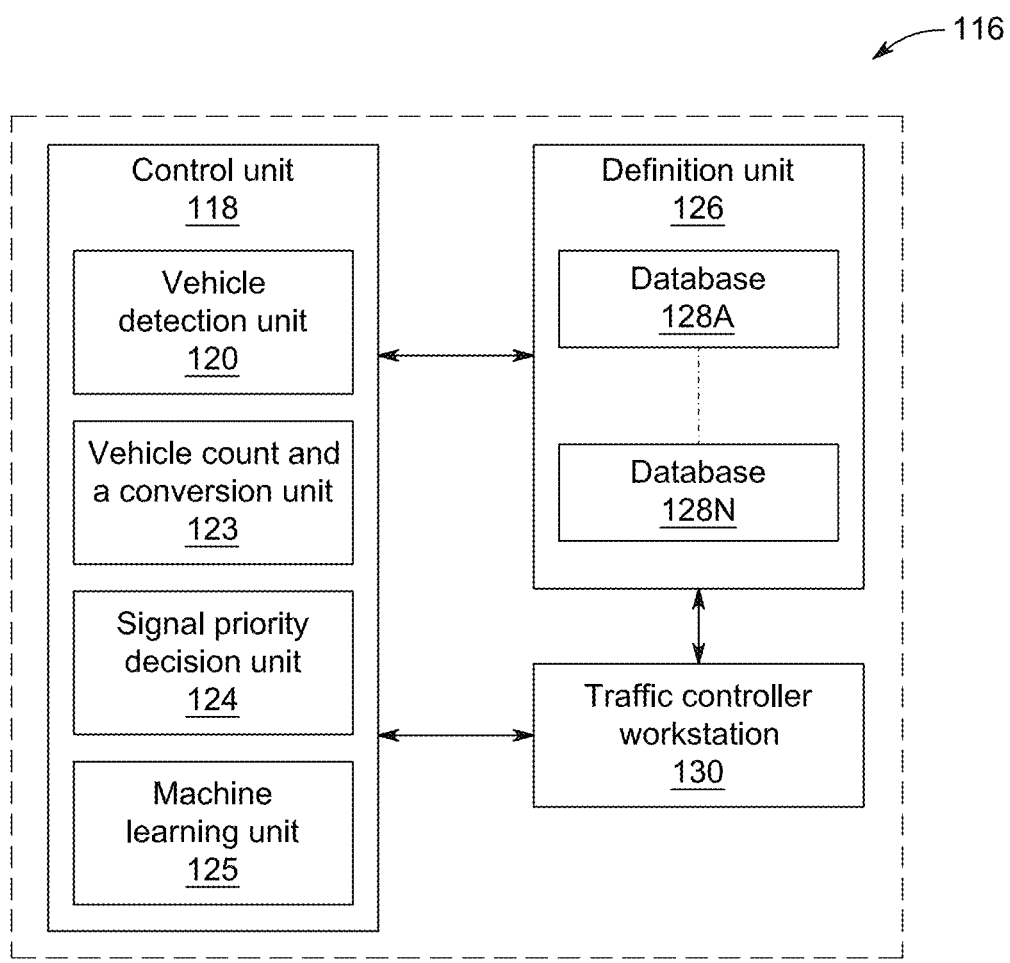
FIG. 1B depicts a control system for controlling traffic lights using control action of the signal light, according to certain embodiments.

FIG. 1B depicts the control system 116 for controlling traffic lights using control action of the signal light, according to certain embodiments. The control system 116 includes a control unit 118, definition unit 126, and a traffic controller workstation 130. The control unit 118 has multiple subunits, the definition unit 126 has multiple database layers, and the traffic controller workstation 130 is connected in one network using wired (e.g., fiber optics) or wireless network means. The control unit 118 further includes (a) a vehicle detection unit 120 for detecting the vehicles entering or exiting the signals, (b) a vehicle count and conversion unit 123 for converting the detected number of vehicles, based on the type of vehicles to an effective number of vehicles, and (c) a signal priority decision unit 124 for sending a required action to a single or group of signals at the same time or sequential time or different time based on the signals' vehicles capacity. The vehicle detection unit 120 is connected to vehicle detection cameras that read and identify vehicles entering or exiting a signal. The vehicle detection unit 120 records the vehicle type and passes it to the vehicles count unit and the conversion unit 123 which will produce a converted number of standard vehicles (the exact effective number of vehicles in each signal) with an indicator that indicates whether a vehicle is an incoming vehicle or exiting vehicle. In some embodiments, the vehicle detection unit 120 obtains an image of a vehicle approaching the location of the first traffic signal terminal and inputs the image to a second ML model to generate vehicle data upon detection of the vehicle in the image. The vehicle data is indicative of a class of the vehicle and the vehicle priority data. In some embodiments, the vehicle detection unit obtains an image from a visual sensor unit/vehicle detection sensor module 106.

The control unit 118 further includes the signal priority decision unit 124 that is configured to analyze the real-time traffic and process determine an action based on a maximum capacity and the expected number of vehicles expected to enter or expected to reach other signals within a period of time. The signal priority decision unit 124 then sends commands to signals far from the current signal to instruct the vehicles to reduce speed from for example, 80 km to 40 km, to clear the way for other signals, at the same time and it may send an opening action to a signal or multiple signals for a particular lane in same street of connected streets to open or change or divert a single lane/lanes base of the decision received. Note that unless specified otherwise, the terms "traffic signal terminal," "signal," "signal light," "light signal," or "traffic light" are used interchangeably.

The definition unit 126 has multiple layers of databases 128-128N, which include a (i) vehicles definition layer where all vehicle names and models are captured, (ii) a vehicles conversation layer that holds the vehicle type and its conversion to numbers of cars (for example, a trailer equivalent to 3 cars), and (iii) a special vehicles layer to capture special vehicles for automatic priority (for example, ambulance cars, school buses, government special cars, etc.). The definition unit 126 further includes (iv) a cities layer to capture the information regarding cities within a district or state, (v) a streets layer that includes a list of all streets within the city coded in a specific way, (vi) a signals mapping layer that includes a list of signals in a particular street and its mapping with possible next signals for incoming or outgoing, and (vii) lanes capacity layer which contains the minimum, maximum, and an opening capacity of a lane.

In several embodiments, the traffic controller workstation 130 updates the database layers 128A-128N of the definition unit 126 whenever there is an update on any layer, such as, when a street or lane is closed due to maintenance. Also, the traffic controller workstation 130 allows control of any traffic action manually whenever needed. The control unit 118 is connected through a traffic network (using fiber or wireless network connections) to the definition unit 126 and one or more detection cameras. In several embodiments, the control system 116 determines an effective count of the vehicle by comparing the size of the class of the detected vehicle to the size of a specified class of a vehicle (e.g., user-specified class such as a full-size sedan) and aggregates the effective count of the vehicles detected at the first traffic signal terminal in a specified time interval to determine the effective number of the vehicles.

Figure 1C:
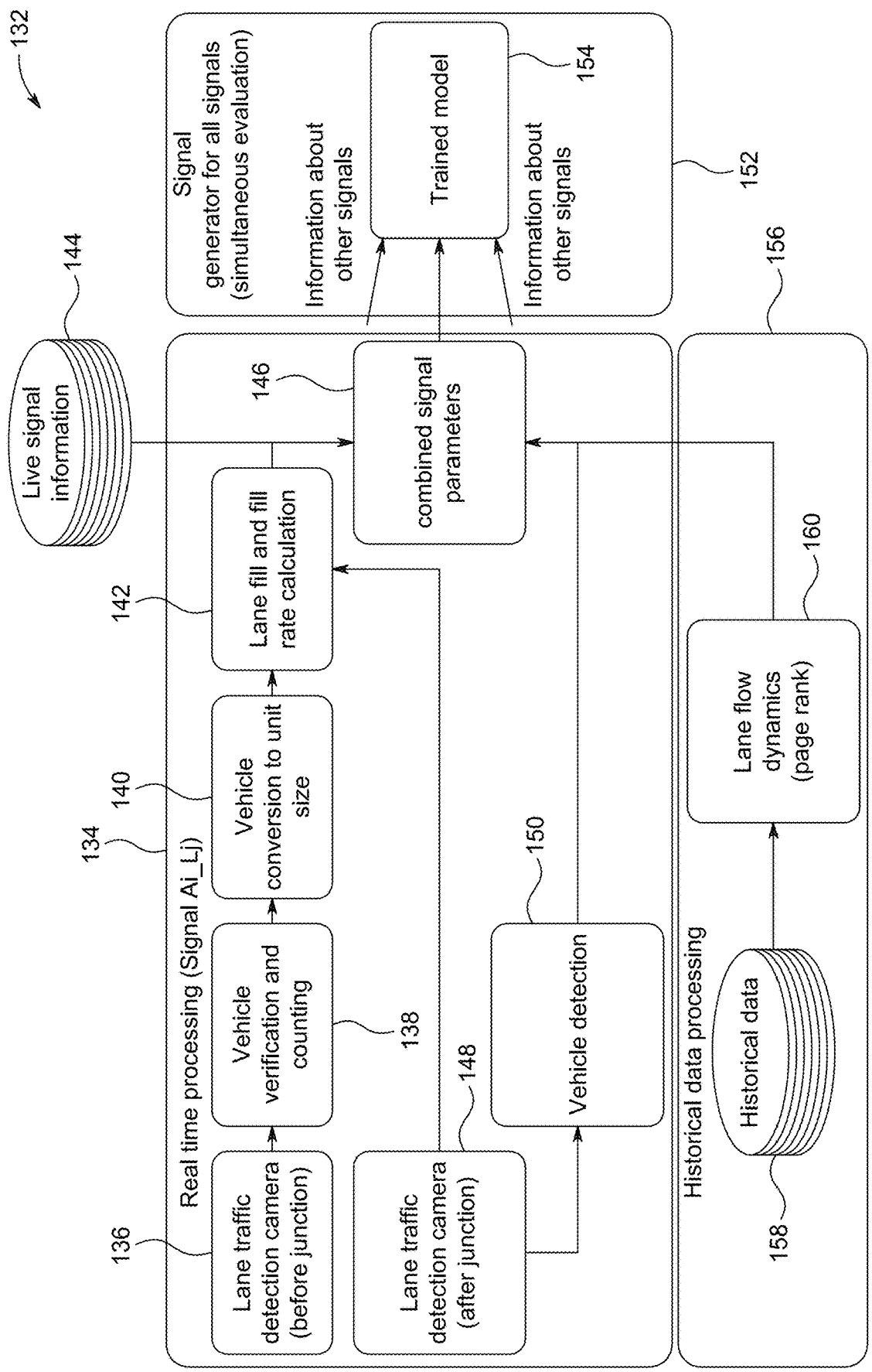
FIG. 1C depicts a systematic process flow for managing the operation of a traffic signal terminal based on the traffic flow of vehicles in proximity of the traffic signal terminal, according to certain embodiments.

FIG. 1C depicts a systematic process flow 132 for managing the operation of a traffic signal terminal based on the traffic flow of vehicles in the proximity of the traffic signal terminal, according to certain embodiments. The control unit 118 performs a real-time processing of signal $Ai\_Lj$ 134, where Ai is the junction ID of a junction where the traffic signal is installed and Lj is the lane ID. During real-time processing of signals 134, at step 136 images captured by a lane traffic detection camera (before junction) is processed using the vehicle detection unit 120 for detecting the vehicles entering or exiting the signals. The vehicle detection unit 120 is connected to vehicle detection cameras (associated with vehicle detection sensor module 106), and the vehicle detection cameras read and identify vehicles entering or exiting a signal. The vehicle detection unit 120 records the vehicle type and passes it to the vehicles count and conversion unit 123 which will produce a converted number of standard vehicles (the effective number of vehicles in each signal) with an indicator that indicates whether a vehicle is an incoming vehicle or exiting vehicle. The real-time processing of signals 134 also includes performing a vehicle verification/identification and counting at step 138 (e.g., using YOLO-8). At step 140, vehicle conversion to unit size such as a car is performed to determine the effective number of vehicles at the junction. At step 142, lane fill and fill rate calculation is performed using the lane data detection module 108 based on the vehicles approaching the junction. At step 146, a live signal information 144 (e.g., real-time signal data such as whether a lane is open or closed, traffic light color for the lane, direction of traffic for the lane for each of the lanes associated with traffic signal $Ai\_Lj$) is combined with lane fill and fill rate of the vehicles entering the traffic signal to generate combined signal parameters 146. At step 148, using the images captured by the lane traffic detection camera of the vehicles exiting the junction, the vehicle count and conversion unit 123 converts the detected number of vehicles to the effective number of vehicles (e.g., based on the type of vehicles) and determines the lane fill and fill rate and adds the data to the combined signal parameters 146. At step 150, priority vehicle detection is performed (e.g., using RESNET 50) and adds the data to the combined signal parameters generated for signal Ai_Lj using a signal priority decision unit 124 for sending a required action to a single or group of signals at the same time or sequential time or different time based on the signal's vehicles capacity. At step 152, simultaneous evaluation is performed for all signals using a trained ML model 154 (e.g., SARSA reinforcement learning model) based on the combined signal parameters 146 to generate a traffic signal message for the particular traffic signal Ai_Lj. The combined signal parameters 146 also includes historic data 158 and lane flow dynamics (using page rank) 160. Historical data may include parameters like inbound and/or outbound lanes/directions, ID's, fill data, fill rate data, vehicle properties, time, vehicle priority, etc. For lane flow dynamics historical data may include lane capacity, line direction, expected next lane, etc.

The present disclosure addresses the problem of traffic control based on using a plurality of dynamic, fine-grained, visual sensor-based observed and derived variables as input. The input may be generated using one or more machine learning (ML) models. For example, a first ML model, such as 'YOLO-8,' may be implemented for object detection (e.g., type of vehicle: car, truck, bike, and so on) and a second ML model, such as 'Resnet-50,' may be implemented for priority vehicle detection (e.g., ambulance, police vehicles, fire engines). The variables include road properties, lane properties, junction properties, vehicle properties, and velocity properties, among others.

Figure 13:
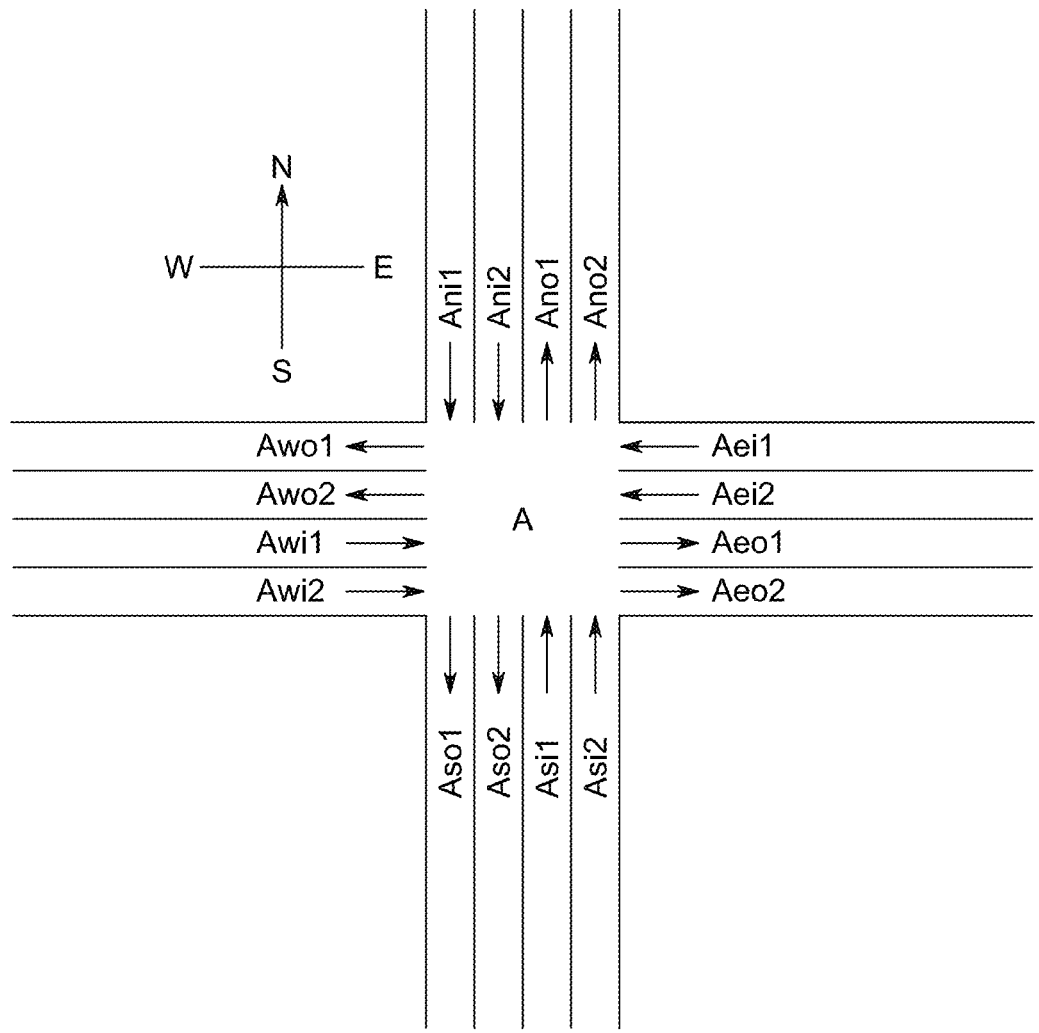
FIG. 13 shows a schematic diagram of a lane model.

For example, see the following and FIG. 13:
Road properties: Road Id, number of lanes, road capacity, next Connecting road ID. Eg: R01, 2 lanes North, 2 lanes South, 100 vehicles. R02,C01
Lane properties: Lane Id, lane direction, lane type, lane capacity, lane fill, lane fill rate, seq number, lane restrictions, next connecting lane ID, alternative lane direction Lane ID. E.g.: Ani1, North to South, inbound, 20 vehicles, 25% fill, +5% per min, seq num: 1 ($1^{st}$ lane), [Max speed 60 mph, No free right turn], Ani5, Awol
Junction properties: Junction Id, lanes intersecting at the junction, traffic signal state currently. E.g.: Junction Id: A, lanes=[Ani1, Ani2, Ano1, Ano2, Aso1, Aso2, . . . ], traffic signal state=[S-Ani1, S-Ani2, S-Ano1, S-Ano2, S-Aso1, S-Aso2, . . . ]
Vehicle properties: movement Type, Type, priority. E.g.: Ambulance, Car, High These properties are fed into an ML algorithm along with other derived parameters to perform the prediction. A control system 116 as shown in FIG. 1B is designed that dynamically analyzes the input and generates output (e.g., a traffic signal message having information such as (a) lane speed data, (b) lane direction data, or (c) lane traffic signal color for a particular traffic signal Ai_Lj) in real-time. Traffic is not only dependent on the properties of the current junction but also on the previous and next junctions. Hence, properties of the preceding and succeeding junctions may also be obtained.

In some embodiments, machine learning and network analysis are employed to identify lane-level network characteristics that are used to determine one or more parameters for controlling traffic. This is aimed at accounting for varying traffic levels through time and space. A directed graph is created for traffic flow, which gives us insight into the network properties of the junction. In some embodiments, a PageRank algorithm is applied to the traffic flow network and centrality and link strength of different related nodes are obtained. This enables accessing the dynamic nature of road flow networks and the interconnection between nodes. In some embodiments, centrality and link strengths are used as inputs into the model along with the variables specified above. To generate the predictions, deep reinforcement learning algorithms, such as SARSA, are utilized. The SARSA may be chosen specifically because it updates its optimization function based on the current as well as the next step in the learning process. In some embodiments, static and dynamic data are fed into the SARSA reinforcement learning algorithm and learn to predict the output of the traffic signals appropriately. The speed of the vehicle, the direction of the traffic signal, and the timing of the traffic light colors are predicted.

Centrality indicates how vital a junction/lane within the network of roads. A junction/lane with high centrality is one that is crucial for traffic flow across the entire network. It acts as a key connector or hub through which a significant portion of traffic passes. junction/lane with high centrality are those that, if blocked or congested, would cause substantial disruptions to the wider road network. These junctions/lanes typically have high traffic volumes, are connections for numerous lanes, or serve as critical points linking different parts of the city or area. Link strength refers to the significance or capacity of the connection between one junction/lane and its neighboring junctions/lanes. Link strength signifies the level of influence one junction/lane has over another through the connecting road. A stronger link means that traffic conditions in one junction are likely to have a more significant impact on the other.

The iterative process of computing Centrality using the variation of the PageRank algorithm may include:
Initialization: Assign each junction (node) an initial centrality score (e.g., equal value for all nodes).
Iteration: For each junction, calculate its new centrality score based on the incoming link strengths from adjacent junctions. A junction receives a higher score if it is connected to many junctions with high traffic flow (strong links) or by junctions that are themselves central.
Normalization: Adjust the centrality scores across all junctions so they sum up to a constant value (normalization) to prevent scores from inflating or deflating arbitrarily.
Convergence: Repeat the iteration process until the centrality scores stabilize and no longer change significantly between iterations. The final scores indicate the relative importance or centrality of each junction in the network.

Once the Centrality is computed, the link strength is computed by considering all the centralities of the junctions that are at either end of the link/lane. The greater the centrality, at both ends, the greater the link strength. Both centrality and link strength are time-of-day dependent. Hence these values are preferably computed for every hour of the day separately.

The system assesses and provides control over traffic flow in a dynamic and changing environment. Assessing traffic is a significant step in the solution of present technology as accurate control depends on accurate assessment. A variety of machine learning algorithms are used to accomplish object detection, input, traffic network properties, and traffic flow learning paradigm. For example, during object detection, the number and class of vehicles are identified using convolutional neural network (CNN) models (e.g., YOLO8 and Resnet 50) to obtain road and lane fills, and the priority of the vehicle (e.g., ambulance). In another example, during input, a variety of input variables such as the one mentioned above are obtained or created (e.g., as described further below). In another example, for determining traffic network properties, the traffic flow is a dynamic and highly interconnected process and to get insight into this nature, PageRank is used to obtain centrality and link strength information for the network. In another example, a SARSA reinforcement learning model is trained using the above information to generate the outputs required.

In controlling traffic dynamically, the following attributes which are used to direct traffic flows for every lane are predicted as output of the model. The output of the model is a traffic signal state which is one of the following colors red, orange, and green. These signals will be spatio-temporally coordinated across the entire network to enable efficient traffic flows. The model may also specify whether traffic would move Left, Right, and forward, make a U-turn, or Stop. As mentioned above, the output may be implemented at the level of lane traffic, allowing for fine-grained and arguably more efficient control. The output may also include speed limit, which is to be set per lane per road per junction to ensure smooth movement of traffic. Also, high-priority vehicles, for example, an ambulance are identified and provided with a high-priority and efficient route dynamically based on the lane direction.

During the object detection, as the first step, the number and type of vehicles and their priority are determined from sensor data obtained using the lane traffic detection cameras installed before or after the junction. The number of vehicles may be counted and classified using ML models such as CNNs. CNNs apply spatial filters to the input image to extract features that can then be classified. CNNs have found success in a large number of visual tasks. The models used may include YOLO 8 for object detection and Resnet for classification of priority of vehicles. These algorithms are chosen for their suitability and efficiency. While YOLO models have demonstrated state-of-the-art performance in object detection, Resnet is a well-used framework that is efficient and will be used for classifying vehicles as priority or others.

Graph-based link analysis and unsupervised ML algorithmic approach may be used to determine the relationship between different junctions in a network of lanes and junctions. In some embodiments, traffic flow is a dynamic process where properties at one traffic light are the function of that particular junction's place within the larger network. This is accommodated in the algorithm by considering the properties of the junction in the context of the network that it is a part of. Junction properties may include Junction Id, lanes intersecting at the junction, traffic signal state currently. Eg: Junction Id: A, lanes=[Ani1, Ani2, Ano1, Ano2, Aso1, Aso2, . . . ], traffic signal state=[S-Ani1, S-Ani2, S-Ano1, S-Ano2, S-Aso1, S-Aso2, . . . ]

The PageRank algorithm is utilized to study traffic flow across the network. PageRank algorithm allows accessing dynamic nature of traffic flow control and is an algorithm that ranks nodes based on their network properties. PageRank algorithm can be considered as the output of a random surfer moving across the network at a steady state.

A directed graph is generated for traffic flow with respect to time intervals and the corresponding network properties from the graph is provided as input to the model 154. The flow variable represents the number of vehicles that pass through a detector per time interval. It is measured in vehicles per interval comprising centrality of the current junction, the centrality of previous junctions, centrality of next junction, link strength between current and previous junctions, link strength between current and next junctions.

For example, a road network is converted to a directed graph represented by nodes (junctions) and edges (lanes). The network properties may include:

Node degree (In-degree and Out-degree): In-degree is the number of roads entering a junction, while out-degree is the number of roads exiting.

Link Strength: The weight of an edge in the network signifies the traffic volume of the lane.

Connectivity: This property indicates how well the junctions (nodes) are connected through lanes (edges)

Centrality: metrics identify the most critical nodes and edges in the network

Temporal Dynamics: Variation in traffic over the time of the day

The following describes a training or learning phase of the model 154, e.g., implemented using deep reinforcement learning model such as SARSA. SARSA is also an on-policy algorithm. On-policy means that during training, the same policy is used for the agent to act (acting policy) and to update the value function (updating policy). To update the current value using SARSA, the reward (Rt+1) is taken following the action taken by the agent, and the value is added for the next state-next action pair γ(St+1, At+1) discounted by gamma, and the current value Q(St,At) is subtracted. The equation (1) describes the update scheme for SARSA:

$$Q(S_t, A_t) = Q(S_t, A_t) + \alpha[R_{t+1} + \gamma Q(S_{t+1}, A_{t+1}) - Q(S_t, A_t)] \quad (1)$$

Wherein $Q(S_t, A_t)$ is updated and current Q estimate for state-action pair, a is the learning rate, $R_{t+1}$ is the reward received following the action taken, γ is the discount factor, $S_{t+1}$ is the value of the next state-next action pair.

Q—value function which is learnt through the SARSA algorithm. Value function represents the expected long-term return or utility of taking a specific action (traffic signal output) while being in a particular state (traffic condition).

$S_t$—Current state of inputs (traffic condition) given to the algorithm at a junction for a lane.

$A_t$—Current action (traffic signal output for the lane at the junction) given by the algorithm.

$R_{t+1}$—Reward given to the reinforcement algorithm for the action taken. Good action gets +1 reward, bad action gets −1 reward.

$S_{t+1}$—Next time interval inputs are given to the algorithm.

$A_{t+1}$—Next action given by the algorithm.

$S_t$ (traffic condition for a lane) is represented by the following parameters:

| Name | Description | Generation Method |
| --- | --- | --- |
| Lane Id | This is a unique identifier for the Lane. | For each incoming lane at the junction, for example: Ani1 |
| Lane Capacity | This enumerates the number of vehicles that can be accommodated in a lane | The number of mid-sized cars which can be accommodated in the lane before the junction |
| Lane Fill | Percentage of the lane occupied by traffic/vehicles at the junction | Number of car equivalents in the lane before the junction divided by the lane capacity |
| Lane Fill rate | The rate at which vehicles are filling the lane | Change in lane fill divided by change in time averaged over a rolling period |
| Lane Speed limit | The speed limit for the lane | Measured in kmph or mph based on user preferences |
| Lane speed throttle at $(T - \Delta)$ | The percentage cap on the lane speed applied to regulate traffic through that lane | Dynamic speed limit divided by maximum speed limit |
| Signal state at $(T - \Delta)$ | Signal state of the signal which was present before for the signal which is expressed in color, direction and speed throttle | Color: Red, Green, Orange Direction: Left, Right, Forwards, U-turn or Stop Lane speed throttle: Percentage of max speed |
| Lane blockage | An indicator to specify if a lane is blocked or free partially or fully | The percentage of blockage of the lane provided by traffic coordinators in real-time (0 to 100%) |
| Related Signals: Signals influenced by the signal in consideration (For Ani1) | | |
| Signal Fills of all the related signals | Percentage of the related lane occupied by traffic/vehicles at the junction | Number of car equivalents in the lane before the junction divided by the lane capacity |
| Rate of Signal Fills of all the related signals | The rate at which vehicles are filling the related lane | Change in lane fill divided by change in time averaged over a rolling period |
| Signal State of all the related signals at $(T - \Delta)$ | The previous state of the signal which is expressed in color, direction and speed throttle | Color: Red, Green, Orange Direction: Left, Right, Forwards, U-turn or Stop Lane speed throttle: Percentage of max speed |
| Speed Limits of all the related signals | The speed limit for the related lanes | Measured in kmph or mph based on user preferences |
| Blockage of all the related signals | An indicator to specify if a related lane is blocked or free partially or fully | The percentage of blockage of the lane provided by traffic coordinators in real-time |
| Machine learning generated inputs on Historical data (PageRank Algorithm) | | |
| Link Strength | Link strength between the current junction and all its related junctions | Derived from the network properties using PageRank algorithm |
| Centrality | Centrality of current and all related junctions | Derived from the network properties using PageRank algorithm |

One of the advantages of using SARSA is that it updates its Q value after taking a step forward from the current state. This lends itself naturally to the problem as the present technology is interested in phenomena linked together. SARSA learns to give priority automatically to certain situations based on its experience learned during training.

The training of the model 154 is performed as follows. Real-world traffic data is used in a simulation environment to train the model 154. Traffic data/information may be obtained from sources such as Open Traffic: https://github-.com/opentraffic/otv2-platform and Mapbox: https://www-.mapbox.com/traffic-data.

The simulation environment is created using the road network information and the Page Rank algorithm output which gives the lane flow dynamics. In several embodiments, the model 154 learns to predict the lane signal output at each junction given all the inputs. The SARSA gets a reward based on the total time taken to resolve the entire traffic at all junctions. It gets an additional reward (e.g., factor of 5× more) for reducing the time of emergency vehicles. Once an optimized model is obtained (e.g., time taken to resolve traffic is minimized or the reward is maximized), it is fine-tuned further on simulated datasets to minimize waiting times.

The following describes the various inputs or variables provided as input to the model 154 in generating rich information (e.g., traffic signal message) as output of the traffic control system. This gives a complete, multi-variable, time-varying insight into traffic flow. The properties of each lane are analyzed for each road at a particular junction.

There are few properties of a particular junction obtained or derived from sensor data, which are provided as input to the model. The signal ID (example for A3L1) is a unique identifier for a traffic signal. The model 154 is trained to generate output for a specific signal ID for each lane separately. It is generated by a Global unique identifier (GUID) randomly and is a 128-bit text string. The lane capacity (e.g., for A3L1) enumerates the number of vehicles that can be accommodated in a lane. The method of generation of lane capacity includes the number of mid-sized cars that can be accommodated in the lane before the junction using a vehicle count and a conversion unit 123 for converting the detected number of vehicles, based on the type of vehicles to a signal's vehicles capacity. The counted number of vehicles after conversion is effective number of vehicles as opposed to actual number of vehicles. The lane fill (e.g., for A3L1) is the percentage of the lane occupied by traffic/vehicles at the junction. It is generated by dividing a number of car equivalents in the lane before the junction by the lane capacity. The lane fill rate (e.g., for A3L1) is the rate at which vehicles are filling the lane. It is generated by a change in lane fill divided by a change in time-averaged over a rolling period. The lane speed limit (e.g., for AL1) is the speed limit for the lane. It is measured in kilometers per hour (kmph) or meters per hour (mph) based on user preferences. The lane speed throttle at (T-A) is the percentage cap on the lane speed applied to regulate traffic through that lane. It is generated by dividing the dynamic speed limit by the maximum speed limit. The signal state at (T-A) is a signal state of the signal which is present before the signal which is expressed in color, direction, and speed throttle. It is generated by representing colors with Red, Green, and Orange and direction with left, right, forwards, U-turn, or Stop Lane speed throttle and percentage of maximum speed. The lane blockage is an indicator to specify if a lane is blocked or free partially or fully. The percentage of blockage of the lane is provided by traffic coordinators in real-time.

The inputs also include information regarding related traffic signals. In some embodiments, related signals include all the signals that (a) impact the traffic inflow into a specific signal or (b) are impacted by the traffic out of the specific signal. The related signals are signals influenced by the signal in consideration (e.g., for A3L1). The signal fills of all the related signals are the percentage of the lane occupied by traffic/vehicles at the junction. It is generated by some car equivalents in the lane before the junction divided by the lane capacity. The rate of signal fills of all the related signals is the rate at which vehicles are filling the lane and is generated by a change in lane fill divided by a change in time-averaged over a rolling period. The signal state of all the related signals at (T–Δ) is the previous state of the signal which is expressed in color, direction, and speed throttle represented by colors including Red, Green, and Orange and direction including Left, Right, Forwards, U-turn or Stop Lane speed throttle and percentage of max speed. The speed limits of all the related signals are the speed limit for the lane and are measured in kmph or mph based on user preferences. The blockage of all the related signals is an indicator to specify if a lane is blocked or free partially or fully. The percentage of blockage of the lane provided by traffic coordinators in real-time.

The inputs may also include machine learning generated inputs on Historical data. For example, the input may include link strength, which is the link strength between the current junction and all its related junctions and is derived from the network properties using the PageRank algorithm.

Aspects of the PageRank algorithm include converting the road network into a directed graph represented by nodes (junctions) and edges (lanes). The network properties are:
Node degree (In-degree and Out-degree): In-degree is the number of roads entering a junction, while out-degree is the number of roads exiting.
Link Strength: The weight of an edge in the network signifies the traffic volume of the lane.
Connectivity: This property indicates how well the junctions (nodes) are connected through lanes (edges)
Centrality: metrics identify the most critical nodes and edges in the network
Temporal Dynamics: Variation in traffic over the time of the day The PageRank algorithm is a way of ranking the importance of elements in a network.

Imagine you have a bunch of web pages with links connecting them. PageRank helps decide which pages are the most important based on how many links point to them and how important those linking pages are.

In the present disclosure, the PageRank algorithm is preferably used to find the importance of the junction and lanes based on the traffic data.

The inputs may include a centrality, which is the centrality of current and all related junctions and is derived from the network properties using the PageRank algorithm.

The model may generate an output, Ai Lj(T), per lane (e.g., a traffic signal message). The following properties of the traffic junction/Road/lane/Signal are specified in the output. The output may include a speed limit, which is the speed limit to be dynamically set at the junction for the specified direction. The output may include a direction of traffic, which specifies whether traffic would move left, right, forward, U-turn, or Stop. The output of the traffic signal includes a color of the traffic light, such as red, orange, and green.

In another exemplary embodiment, a method for managing the operation of a traffic signal terminal based on the traffic flow of vehicles in the proximity of the traffic signal terminal is described. The method includes obtaining training data for training a machine learning (ML) model 154 to generate a traffic signal message for transmission to a first traffic signal terminal of multiple traffic signal terminals in a traffic grid. Obtaining the training data includes determining, based on real-time vehicle data input obtained from a vehicle detection sensor unit, lane data associated with each traffic signal terminal of a set of traffic signal terminals. The lane data includes lane fill data that is indicative of a percentage of a lane occupied by vehicles at a location where a traffic signal terminal of the set of traffic signal terminals is installed, and lane fill rate that is indicative of a rate at which the lane is filled with vehicles. The lane data is obtained for each lane of multiple lanes at the location, and the set of traffic signal terminals includes the first traffic signal terminal and related traffic signal terminals, which correspond to those of the traffic signal terminals related to the first traffic signal terminal.

The method also includes obtaining, from a data storage system, traffic flow data that is indicative of traffic flow between the traffic signal terminals at various time intervals.

The method also includes training the ML model 154 with the training data to generate the traffic signal message. The traffic signal message includes, for each lane, lane speed data that is indicative of a speed limit to be followed on the lane, lane direction data that is indicative of a direction in which vehicular traffic on the lane has to move, or lane traffic signal color. In an implementation, the ML model 154 uses a cost function that is indicative of a reward assigned to the ML model 154 based on the wait time of the vehicular traffic at the first traffic signal terminal.

The ML model 154 is iteratively trained to increase the cost function. In an implementation, determining the lane data includes generating vehicle data upon detection of a vehicle in the real-time vehicle data. The vehicle data is indicative of a class of the vehicle. Determining lane data also includes determining an effective number of the vehicles based on the class of each of the multiple vehicles detected and determining the lane fill data based on the effective number of the vehicles and the lane capacity of the lane.

In an implementation, obtaining the traffic flow data includes generating a representation of the traffic grid as a directed graph of nodes and links. Each of the nodes represents a specified traffic signal terminal of the traffic grid. Each of the links between a pair of nodes represents a path for traffic flow between traffic signal terminals corresponding to the pair of nodes and a direction of the traffic flow. Obtaining the traffic data also includes determining link strength for each of the links between the nodes corresponding to the set of traffic signal terminals. The link strength is indicative of an effective number of vehicles passing between two traffic signal terminals. Obtaining the traffic data also includes assigning a weight to each of the nodes corresponding to the set of traffic signal terminals based on the link strength. Obtaining the traffic data also includes inputting the link strength and the weight associated with the set of traffic signal terminals as part of the training data for the ML model 154.

In an implementation, the method also includes obtaining real-time vehicle data from the vehicle detection sensor unit at a specified time. The method also includes determining lane data of the set of traffic signal terminals based on real-time vehicle data. The method also includes inputting the lane data and the traffic flow data to the ML model to generate a predicted traffic signal message.

The method also includes transmitting the predicted traffic signal message to the first traffic signal terminal to cause the first traffic signal terminal to display the predicted traffic signal message.

In another exemplary embodiment, a non-transitory computer-readable storage medium for storing computer-readable instructions that, when executed by a computer, cause the computer to perform a method is described. The method includes determining lane data associated with each traffic signal terminal of a set of traffic signal terminals. The lane data includes lane fill data that is indicative of a percentage of a lane occupied by vehicles at a location where a traffic signal terminal of the set of traffic signal terminals is installed, and lane fill rate that is indicative of a rate at which the lane is filled with vehicles. The lane data is obtained for each lane of multiple lanes at the location, and the set of traffic signal terminals includes a first traffic signal terminal of multiple traffic signal terminals in a traffic grid and those of the traffic signal terminals related to the first traffic signal terminal. The method also includes obtaining, from a data storage system, traffic flow data that is indicative of traffic flow between the traffic signal terminals at various times. The method also includes generating, based on the lane data and the traffic flow data, a traffic signal message for the first traffic signal terminal. The traffic signal message includes, for each lane, lane speed data that is indicative of a speed limit to be followed in the lane, lane direction data that is indicative of a direction in which vehicular traffic on the lane has to move, or lane traffic signal color. The method also includes transmitting the traffic signal message to the first traffic signal terminal to cause the first traffic signal terminal to display the traffic signal message.

Figure 2:
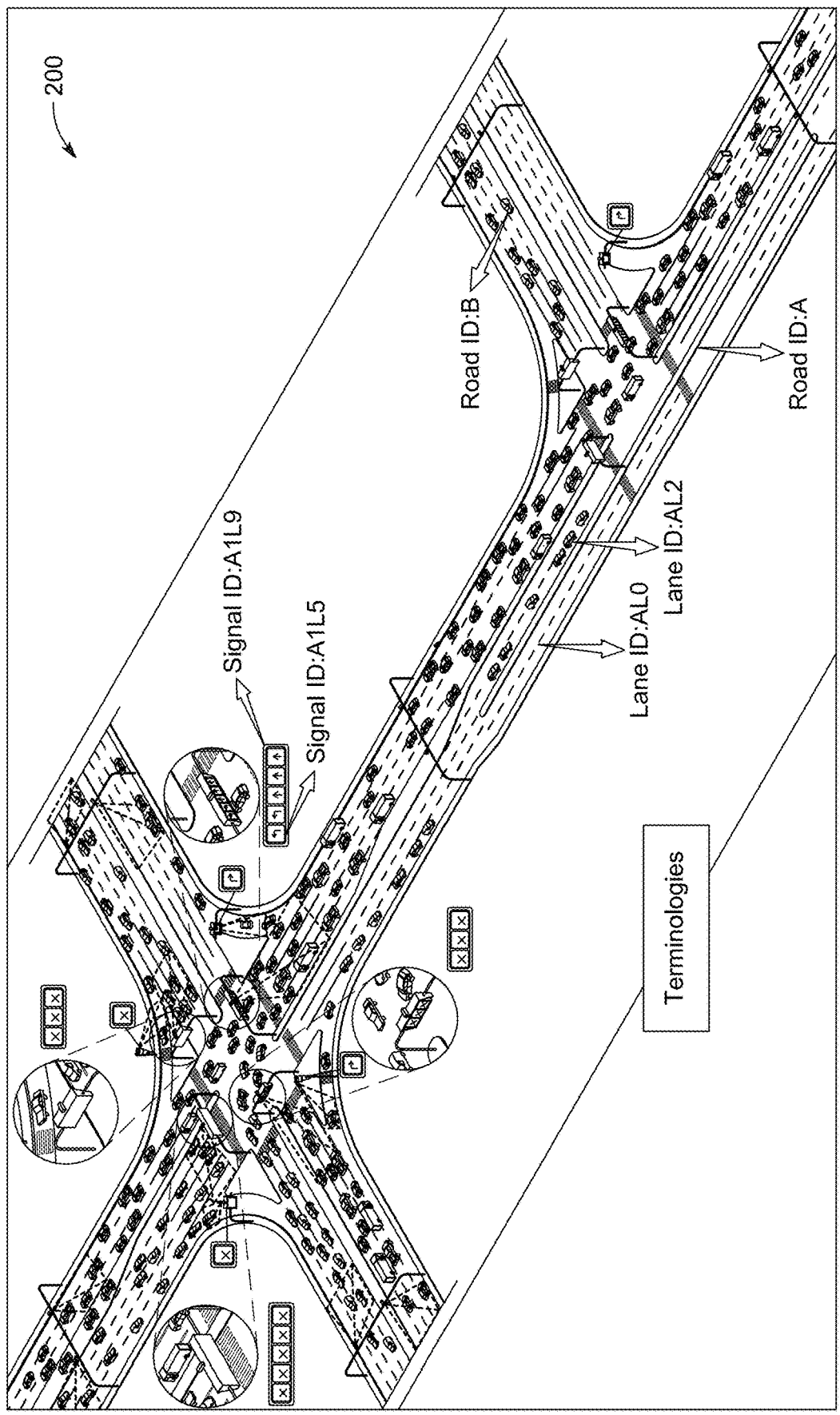
FIG. 2 depicts terminologies to describe the methodology and application of artificial intelligence, machine learning, and deep learning techniques, according to certain embodiments.

FIG. 2 depicts terminologies 200 to describe the methodology and application of artificial intelligence, machine learning, and deep learning techniques, according to certain embodiments. The terminologies 200 comprise road ID, junction ID, lane ID, signal ID, time, and related signals. The road ID is represented by alphabet sequence for example: "A" or "B" or "AA" etc. The junction ID is represented by road ID followed by a number, for example junction between road A and road B is A3, provided road A is the prominent road. The junctions of road A are A0, A1, A2, and so on. The lane ID represents the ID of the lane in the road, for example: for Road A, the lanes are A_L0, A_L1, A_L2, and so on. The signal ID is the signal at a junction determined separately for each lane. The signal ID is a combination of junction ID and lane ID, for example: A0_L0, A0_L1, A1_L3, and so on. The current signal state at time "T" is what is generated in the present technology. It is represented as A0_L0 (T), A1_L3 (T), and so on. In previous instances of time, it is A0_L0 (T−Δ), A1_L3 (T−Δ), and so on. The time delta is the shortest duration of time for which the signal state remains the same. (Example: Δ=15 seconds. After every 15 seconds all the signals are computed again simultaneously). All the signals that impact the traffic inflow into the specific signal or impacted by the traffic out of the specific signal are called the related signals. The traffic inflow and outflow impact can span over multiple previous and next junctions. A3_Lx is influenced by not only A2_Lx but also A1_Lx. Similarly, A3_Lx influences A4_Lx and A5_Lx, and so on. For example, for signal A3_L1, the signals A2_L1, A1_L1, A4_L1, A5_L1, B3_L1, B3_L2 and so on are related Signals.

Figure 3:
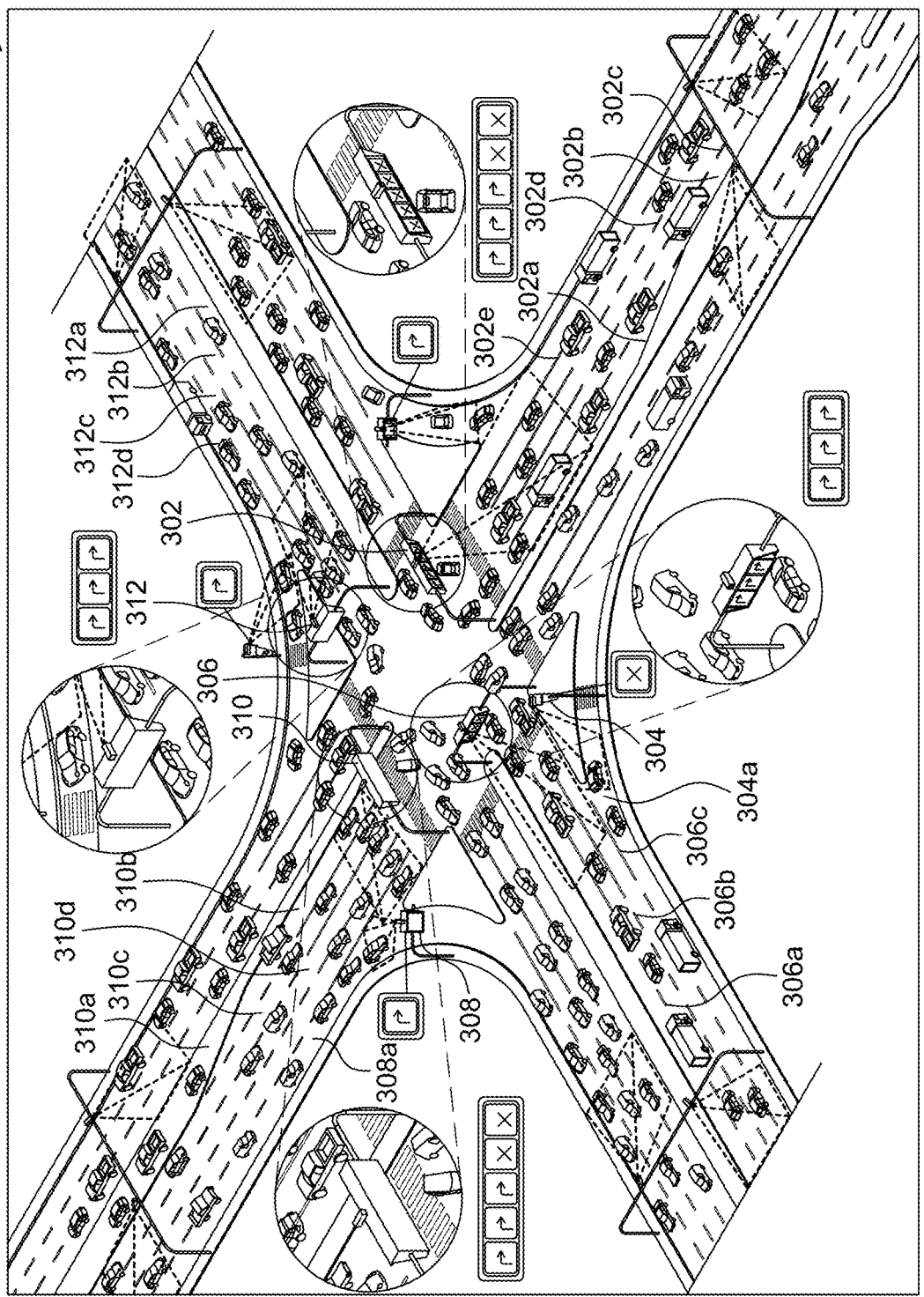
FIG. 3 depicts four signals 1, 7, 5, and 3 lanes with priority action to change the lane direction and the right lane corners signals closed at signals 2 and 4, according to certain embodiments.

FIG. 3 depicts four signals 1, 7, 5, and 3 lanes with priority action to change the lanes direction 300 and the right lane corners signals closed at signals 2 and 4, according to certain embodiments. Signal 1 302 with lanes 302a, 302b, 302c, 302d, and 302e have received three priority actions to move towards the right concerning lanes 302a, 302b, and 302c. Similarly signal 3 306 with lanes 306a, 306b, and 306c has also received three priority actions to move towards the right. Signal 5 310 with lanes 310a, 310b, 310c, and 310d has received three priority actions to move towards the right concerning lanes 310a, 310b, and 310c. Signal 7 312 with lanes 312a, 312b, 312c, and 312d has received three priority actions to move towards the right concerning lanes 312a, 312b, and 312c. Signal 2 304 is the right lane 304a beside signal 3 306 and signal 2 304 is closed. The signal 4 308 is right lane corner 908a beside signal 5 310 and signal 4 308 is closed.

Figure 4:
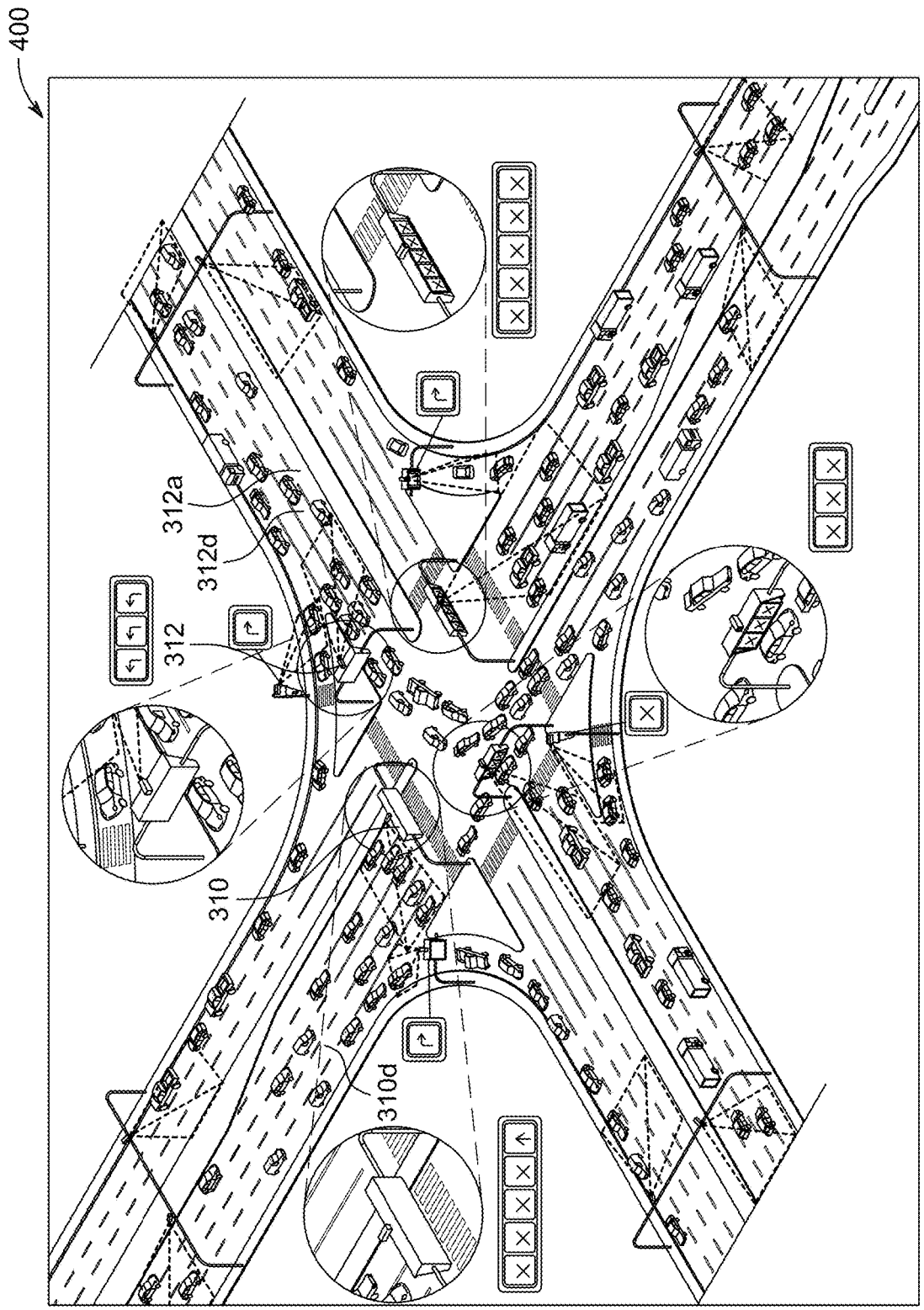
FIG. 4 depicts signal 5 and signal 7 receiving priority action to change the lanes, according to certain embodiments.

FIG. 4 depicts signal 5 and signal 7 received priority action to change lanes 400, according to certain embodiments. Signal 5 310 has received priority action to open lane 4 310b to go only straight. The signal 7 312 has received priority action to open 2 lanes 1 312a and 2 312b only, lane 1 312a has received action to move to the standard left side and lane 2 312b to compulsory change lane direction to left as well.

Figure 5:
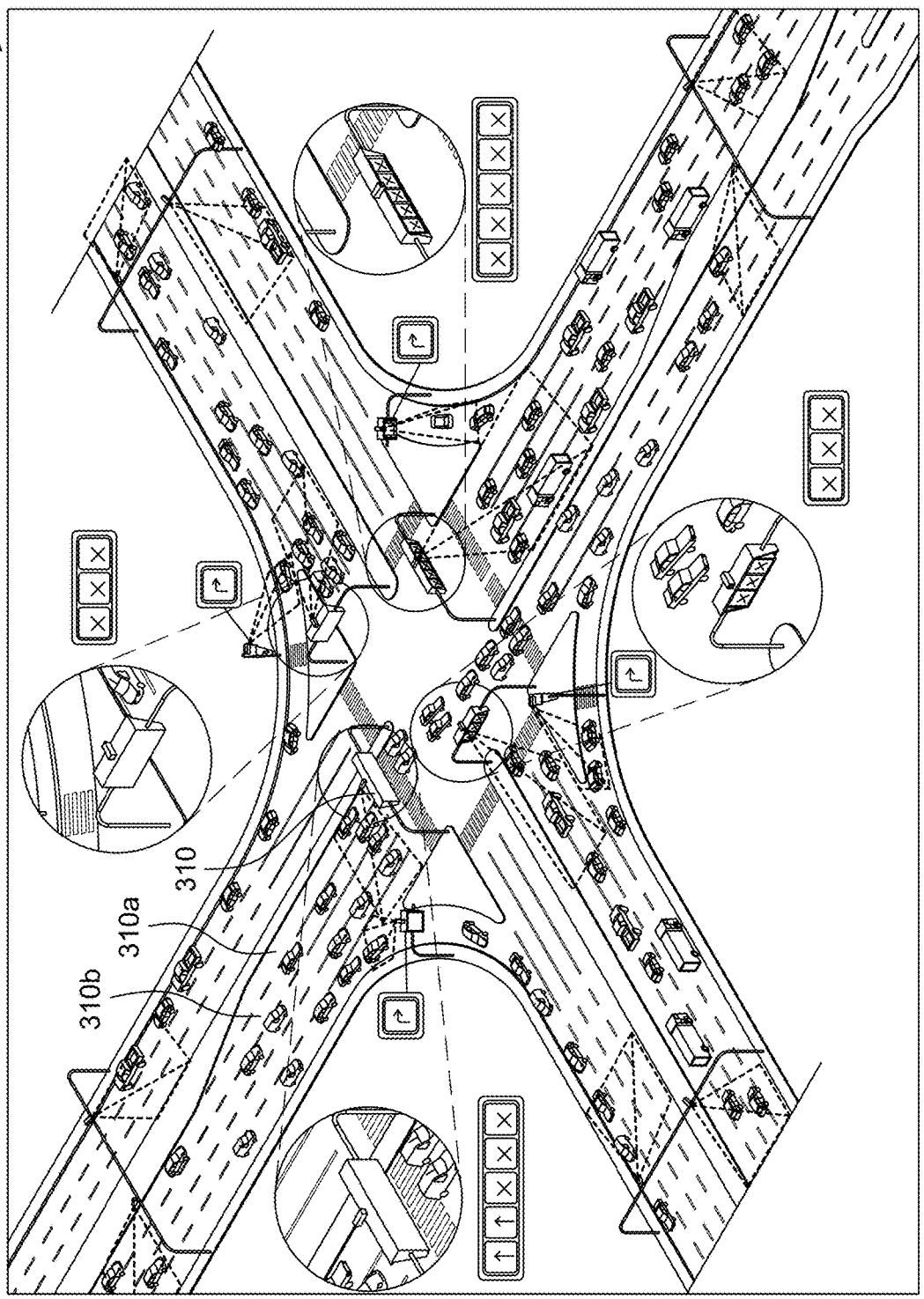
FIG. 5 depicts signal 5 receiving priority action to change the lanes and signals 1, 7, and 3 received priority action to stop all lanes, according to certain embodiments.

FIG. 5 depicts signal 5 receiving priority action to change the lanes and signals 1, 7, and 3 receiving priority action to stop all lanes 500, according to certain embodiments. Signals 1 302, 7 312, and 3 306 receive priority action to stop all lanes, but signal 5 310 got 2 priority actions, first to change the direction for lane 1 310a to go ahead instead of taking left, and 2nd lane 310b receive open action to go ahead. All right signals also act to open the signals.

Figure 6:
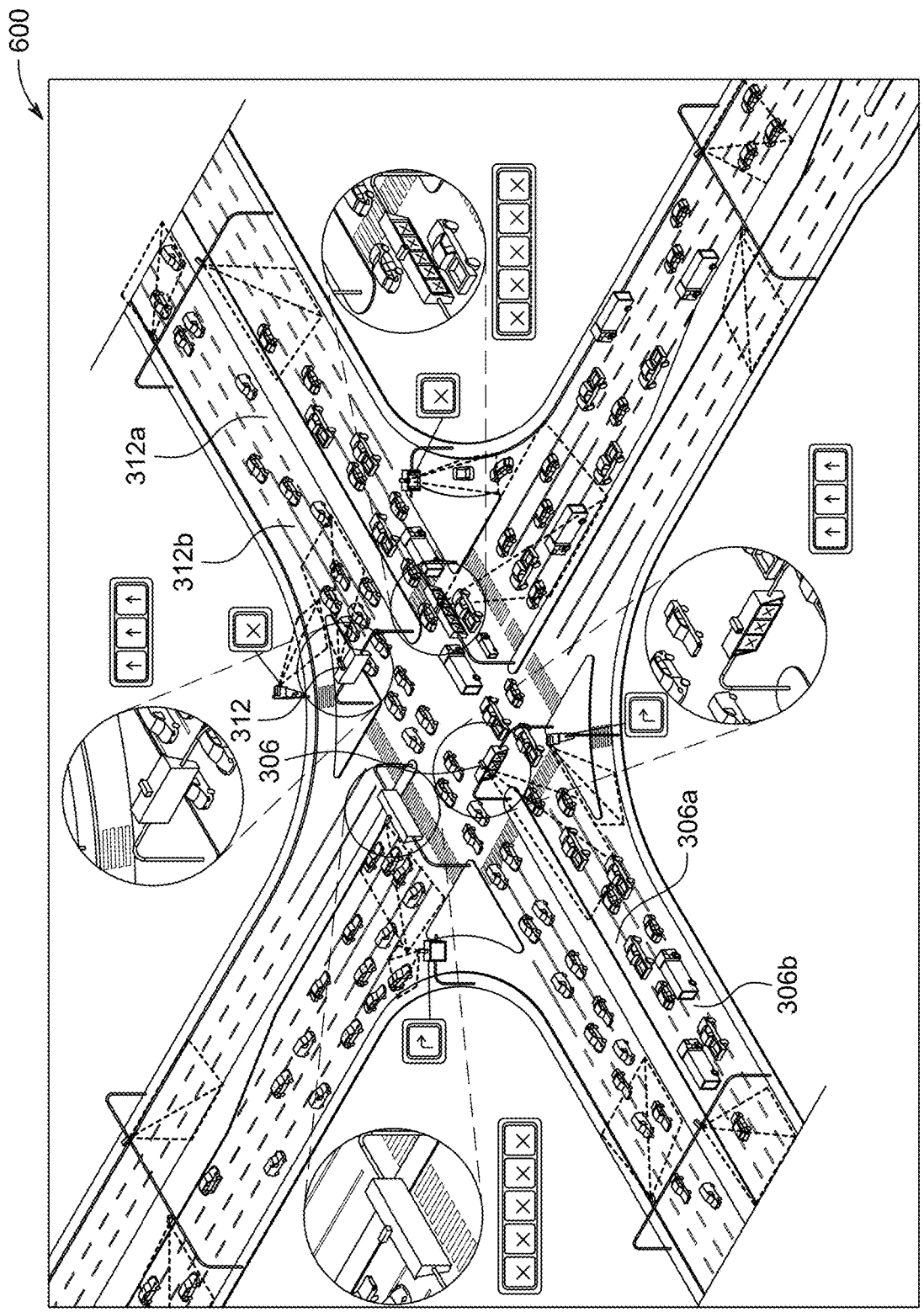
FIG. 6 depicts signals 7 and 3 receiving two priority actions and signals 1 and 5 receiving priority action to stop all lanes, according to certain embodiments.

FIG. 6 depicts signals 7 and 3 receiving two priority actions and signals 1 and 5 receiving priority action to stop all lanes 600, according to certain embodiments. Signals 1 302 and 5 310 receive priority action to stop all lanes, but each signal of signals 7 312 and 3 306 receive two priority actions, first to change the direction for lanes 1 312a and 306a to go ahead instead of taking left, and lane 2 312b and 306b received open action to go ahead. All right signals got priority action to stop except signal 2 304.

Figure 7:
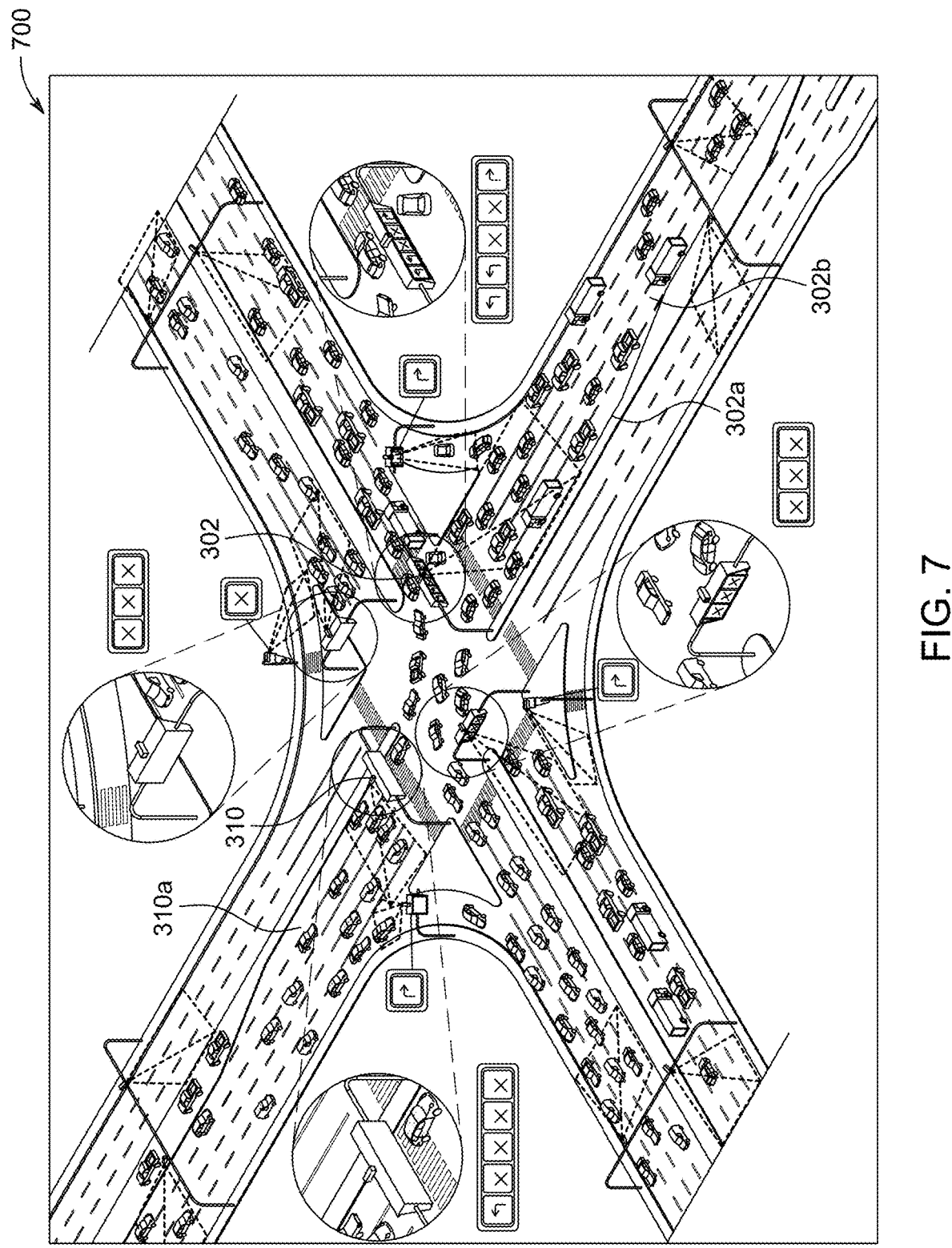
FIG. 7 depicts signals 1 and 5 receiving priority action and signals 7 and 3 receiving priority action to stop all lanes, according to certain embodiments.

FIG. 7 depicts signals 1 and 5 receiving priority action and signals 7 and 3 receiving priority action to stop all lanes 700, according to certain embodiments. The signals 7 312 and 3 306 receive priority action to stop all lanes but signal1 302 receives two priority actions, first to open lane no. 1 302a and the second to change the direction for lane 2 302b to take left instead of going straight, signal 5 310 receives priority action to open lane 1 310a only taking a turn to the left.

Figure 8:
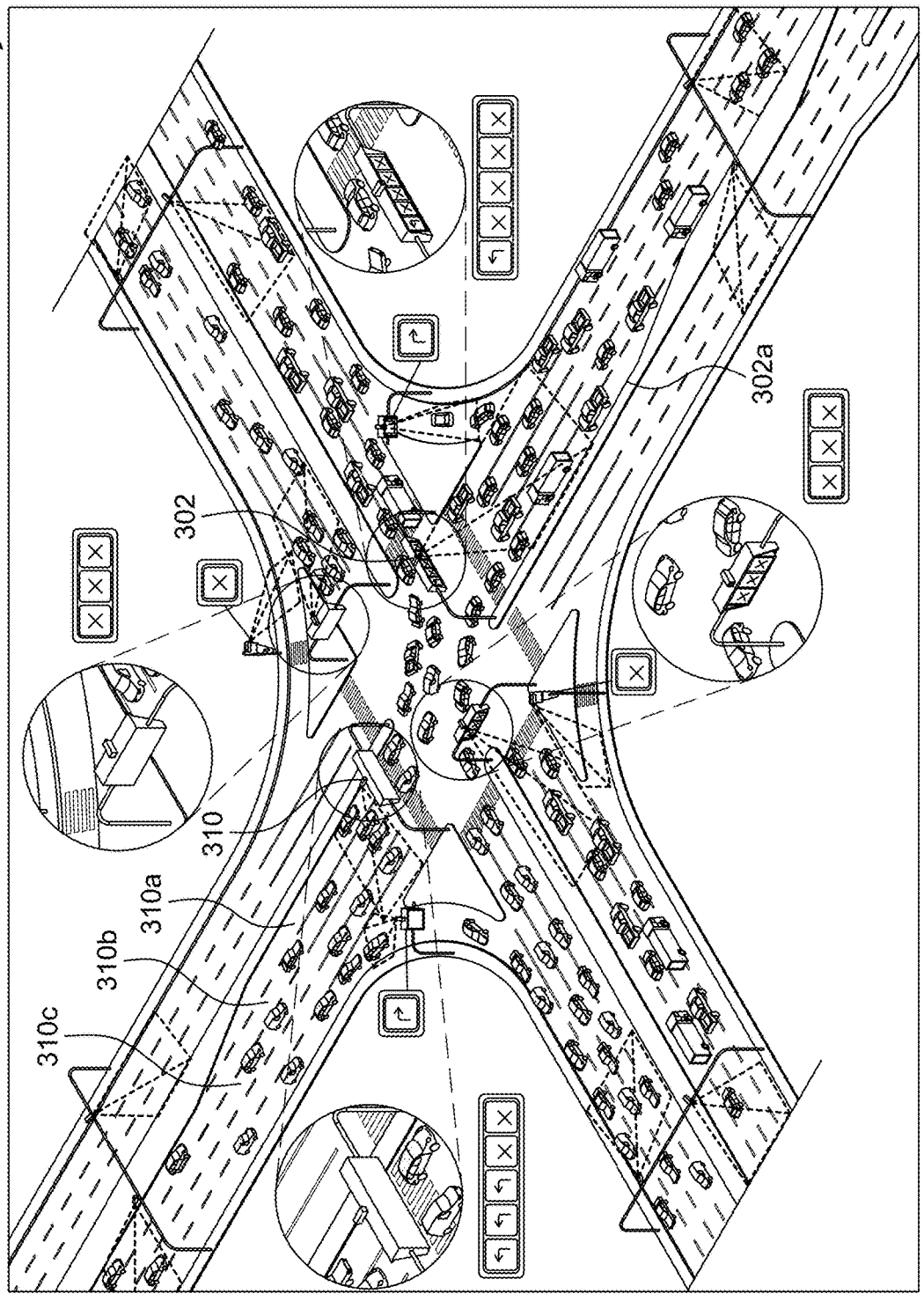
FIG. 8 depicts signals 1 and 5 receiving priority action to change lanes and signals 7 and 3 receiving priority action to stop all lanes, according to certain embodiments.

FIG. 8 depicts signals 1 and 5 receiving priority action to change lanes and signals 7 and 3 receiving priority action to stop all lanes 800, according to certain embodiments. Signals 7 312 and 3 306 receive priority action to stop all lanes but signal 1 302 receives one priority action to open lane no.1 302a. Signal 5 310 receives three priority actions to open lane 1 310a, and to change the direction for lane 2 310b and 3 310c to take left instead of going straight.

Figure 9:
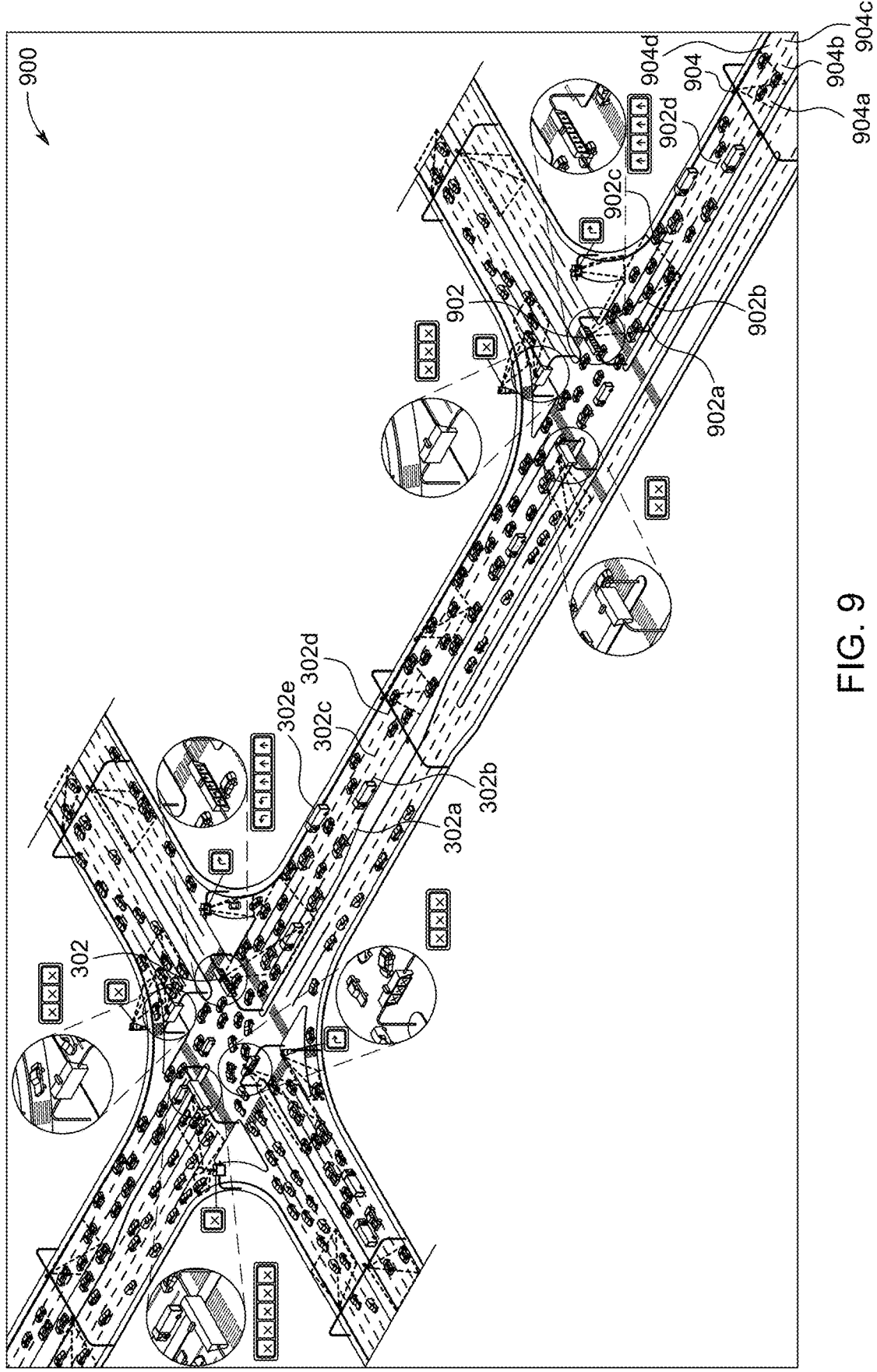
FIG. 9 depicts signals 24, 20, and 1 receiving priority action to change the lanes, according to certain embodiments.

FIG. 9 depicts signals 24, 20, and 1 receiving priority action to change lanes 900, according to certain embodiments. Signals 24 904 get priority action to open the 4 lanes 904a, 904b, 904c, and 904d, and at the same time signal 20 902 got priority action to allow the 4 lanes 902a, 902b, 902c and 902d to move straight, simultaneously signal 1 302 got priority action to open lanes 3 302c, 4 302d, and 5 302e to go ahead and lane 1 302a to take left turn and lane 2 302b to take compulsory lane change to left side.

Figure 10:
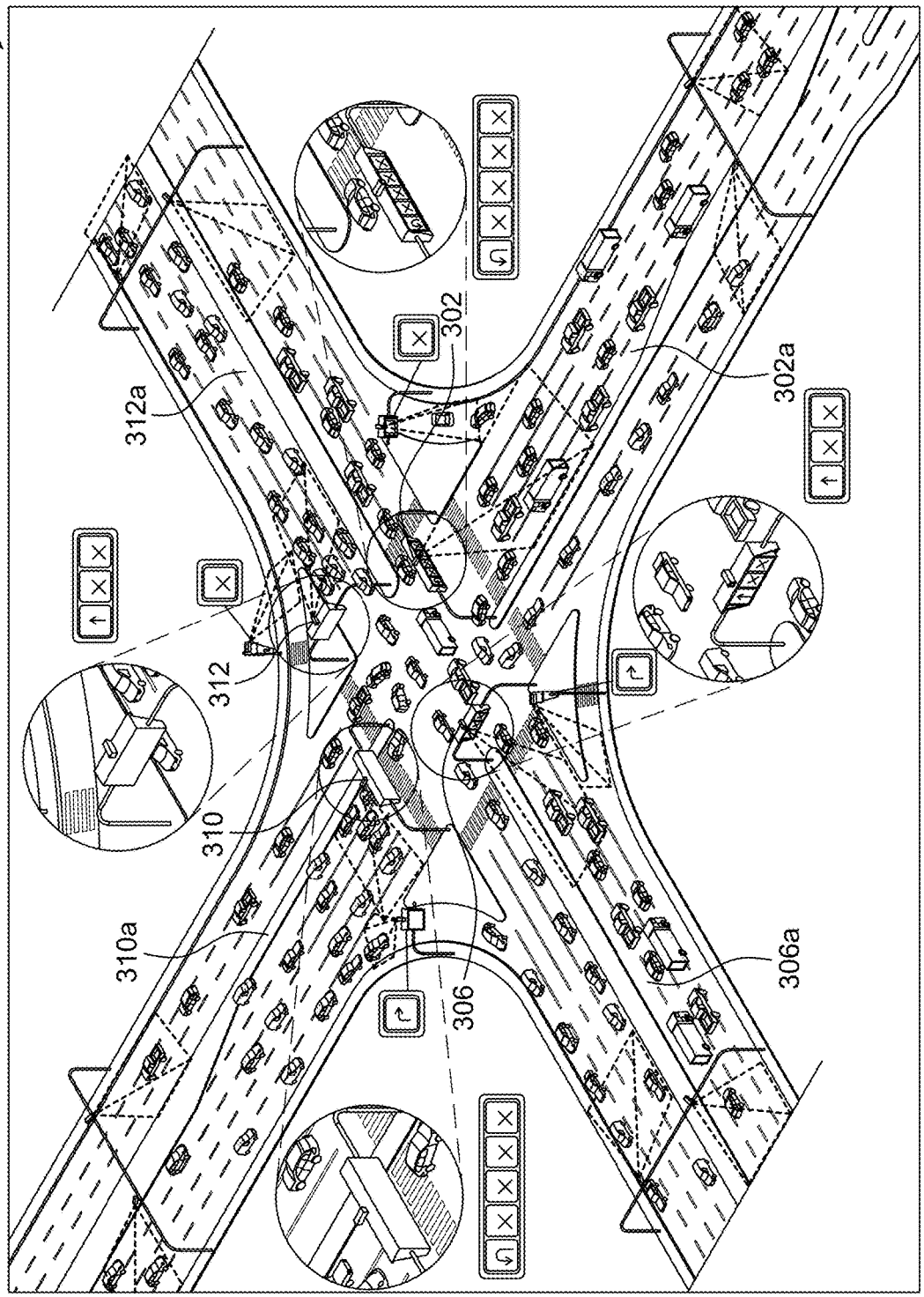
FIG. 10 depicts signals 1, 5, 7, and 3 receiving priority action to change the lanes, according to certain embodiments.

FIG. 10 depicts signals 1, 5, 7, and 3 receiving priority action to change lanes 1000, according to certain embodiments. Signal 1 302 and lane 1 302a got priority action to open for turnaround at the same time the same action was given to signal 5 310 lane 1 310a, signals 7 312 and 3 306 got priority action to open lane 1 312a and 306a in both sides.

Figure 11:
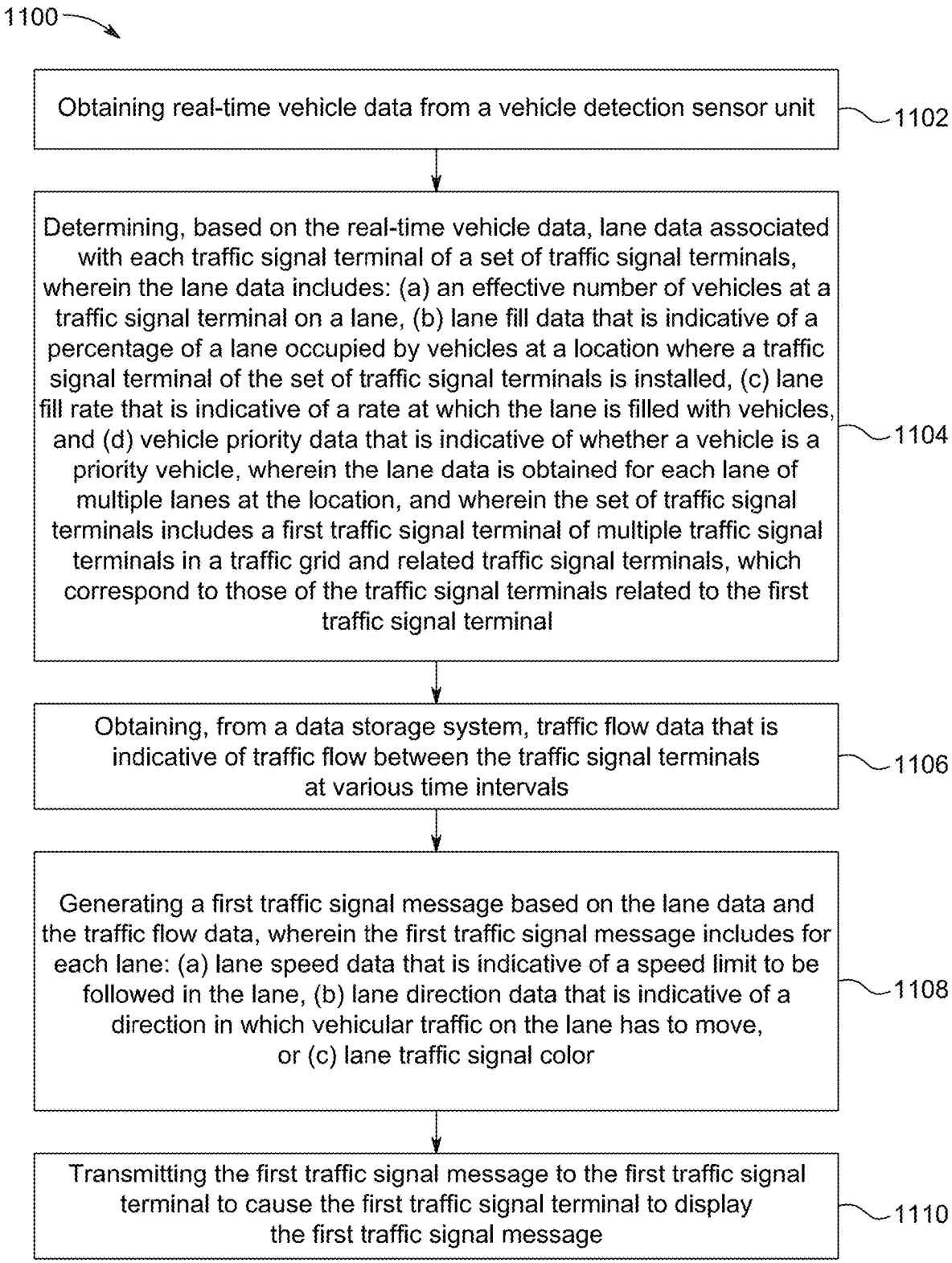
FIG. 11 depicts a flowchart of a method for managing the operation of a traffic signal terminal based on traffic flow of vehicles in the proximity of the traffic signal terminal, according to certain embodiments.

FIG. 11 depicts a flowchart 1100 of a method for managing the operation of a traffic signal terminal based on traffic flow of vehicles in the proximity of the traffic signal terminal, according to certain embodiments. At step 1102, real-time vehicle data (e.g., an image of a vehicle approaching the location of the traffic signal terminal) is obtained from a vehicle detection sensor unit. At step 1104, based on the real-time vehicle data, lane data associated with each traffic signal terminal of a set of traffic signal terminals is determined. The lane data includes an effective number of vehicles at a traffic signal terminal on a lane, lane fill data that is indicative of a percentage of a lane occupied by vehicles at a location where a traffic signal terminal of the set of traffic signal terminals is installed, lane fill rate that is indicative of a rate at which the lane is filled with vehicles, and vehicle priority data that is indicative of whether a vehicle is a priority vehicle. The lane data is obtained for each lane of multiple lanes at the location. The set of traffic signal terminals includes a first traffic signal terminal of multiple traffic signal terminals in a traffic grid and related traffic signal terminals, which correspond to those of the traffic signal terminals related to the first traffic signal terminal.

At step 1106, traffic flow data that is indicative of traffic flow between the traffic signal terminals at various time intervals is obtained, from a data storage system.

At step 1108, a first traffic signal message is generated based on the lane data and the traffic flow data. The first traffic signal message includes for each lane with lane speed data that is indicative of a speed limit to be followed in the lane, lane direction data that is indicative of a direction in which vehicular traffic on the lane has to move, or lane traffic signal color. At step 1110, the first traffic signal message is transmitted to the first traffic signal terminal to cause the first traffic signal terminal to display the first traffic signal message.

In an implementation, the method also includes determining the lane data or the traffic flow data after a specified time interval and generating a second traffic signal message after the specified time interval. The lane direction data in the second traffic signal message is indicative of a second direction in which the vehicular traffic on the lane has to move, and the second direction is different from the direction indicated in the first traffic signal message.

In an implementation, the method also includes training a first machine learning (ML) model using training data to generate predicted traffic signal messages. The training data includes lane data associated with the set of traffic signal terminals, and the traffic flow data associated with the traffic grid. In an implementation, the first ML model uses a cost function that is indicative of a reward assigned to the first ML model based on a wait time of the vehicular traffic at the first traffic signal terminal. In an implementation, the cost function includes an additional reward that is assigned to the first ML model for reducing the wait time of a priority vehicle. In an implementation, the additional reward assigned for the first ML model is greater than the reward awarded for reducing the wait time of a non-priority vehicle. In an implementation, the first ML model is iteratively trained to increase the cost function.

In an implementation, obtaining the real-time vehicle data includes obtaining, using a visual sensor unit of the vehicle detection sensor unit, an image of a vehicle approaching the location of the first traffic signal terminal and inputting the image to a second ML model to generate vehicle data upon detection of the vehicle in the image. The vehicle data is indicative of a class of the vehicle and the vehicle priority data. In an implementation, the method also includes determining an effective count of the vehicle by comparing the size of the class of the vehicle to the size of a specified class of a vehicle and aggregating the effective count of the vehicles detected at the first traffic signal terminal in a specified time interval to determine the effective number of the vehicles.

In an implementation, determining the lane data includes determining the lane fill data of the lane based on the effective number of vehicles and the lane capacity of the lane. In an implementation, the related traffic signal terminals include those of the traffic signal terminals from which vehicular traffic flows towards the first traffic signal terminal, or to which the vehicular traffic flows from the first traffic signal terminal.

In an implementation determining the traffic flow data includes generating a representation of the traffic grid as a directed graph of nodes and links. Each of the nodes represents a specified traffic signal terminal of the traffic grid. each of the links between a pair of nodes represents a path for traffic flow between traffic signal terminals corresponding to the pair of nodes and a direction of the traffic flow. Determining the traffic flow data also includes determining link strength for each of the links between the nodes corresponding to the set of traffic signal terminals. The link strength is indicative of the effective number of vehicles passing between two traffic signal terminals. Determining the traffic flow data also includes determining the centrality of each of the nodes corresponding to the set of traffic signal terminals based on the link strength. The centrality is indicative of a weight associated with each of the nodes. In an implementation, the method also includes inputting the link strength and the centrality associated with the set of traffic signal terminals as part of training data to a first ML model to generate predicted traffic signal messages. In an implementation, the method also includes generating the first traffic signal message based on an event. The event includes the expiry of a time interval, wait time of a priority vehicle at the first traffic signal terminal or a related traffic signal terminal exceeding a first specified time limit, wait time of any of the vehicles at the first traffic signal terminal or the related traffic signal terminal exceeding a second specified time limit, or lane fill data associated with first traffic signal terminal or the related traffic signal terminal exceeding a specified threshold limit.

Figure 12:
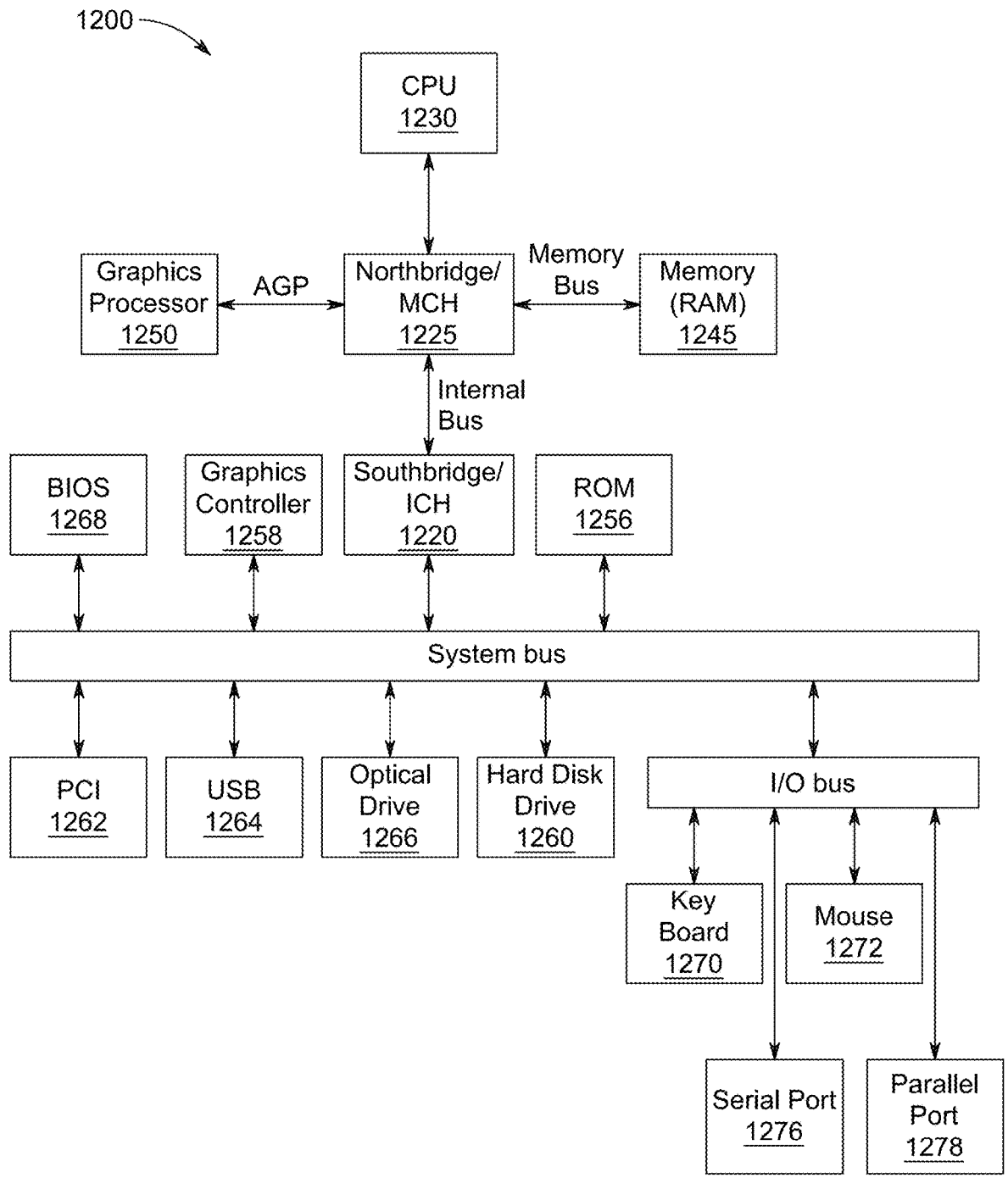
FIG. 12 shows a schematic diagram of a data processing system, according to certain embodiments, for performing the functions of the exemplary embodiments.

FIG. 12 shows a schematic diagram of a data processing system, according to certain embodiments, for performing the functions of the exemplary embodiments. The data processing system is an example of a computer in which code or instructions implementing the processes of the illustrative embodiments may be located. In FIG. 12, data processing system 1200 employs a hub architecture including a north bridge and memory controller hub (NB/MCH) 1265 and a south bridge and input/output (I/O) controller hub (SB/ICH) 1220. The central processing unit (CPU) 1230 is connected to NB/MCH 1225. The NB/MCH 1225 also connects to the memory 1245 via a memory bus and connects to the graphics processor 1250 via an accelerated graphics port (AGP). The NB/MCH 1225 also connects to the SB/ICH 1220 via an internal bus (e.g., a unified media interface or a direct media interface). The CPU Processing unit 1230 may contain one or more processors and even may be implemented using one or more heterogeneous processor systems.

Referring again to FIG. 12, the data processing system 1200 can include that the SB/ICH 1220 is coupled through a system bus to an I/O Bus, a read only memory (ROM) 1256, universal serial bus (USB) port 64, a flash binary input/output system (BIOS) 1268, and a graphics controller 1258. PCI/PCIe devices can also be coupled to SB/ICH 688 through a PCI bus 1262.

The PCI devices may include, for example, Ethernet adapters, add-in cards, and PC cards for notebook computers. The Hard disk drive 1260 and CD-ROM 66 can use, for example, an integrated drive electronics (IDE) or serial advanced technology attachment (SATA) interface. In one implementation the I/O bus can include a super I/O (SIO) device.

Further, the hard disk drive (HDD) 1260 and optical drive 1266 can also be coupled to the SB/ICH 1220 through a system bus. In one implementation, a keyboard 1270, a mouse 1272, a parallel port 1278, and a serial port 1276 can be connected to the system bus through the I/O bus. Other peripherals and devices that can be connected to the SB/ICH 1220 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

The functions and features described herein may also be executed by various distributed components of a system. For example, one or more processors may execute these system functions, wherein the processors are distributed across multiple components communicating in a network. The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The present technology allows the flow of vehicles in multiple directions by opening/closing/slowing vehicles/changing lane light signals at the same time or sequentially depending on the data received from the signal priority decision unit. The volume of traffic, or the expected volume, may rise after the opening of other traffic lights in other signals. This technology could allow the flow of vehicles with the same mechanism of giving priority, so the traffic signals may receive priority action in advance preparing vehicle movement to avoid congestion. With the new design of the digital traffic light, it can adopt multiple directions beyond the traditional direction with a mix mode of numbers, arrow, letters or words. The technology relates to the field of video vehicle detection and link matching and the technical field of traffic engineering, and more specifically, it relates to a control system for determining priority, when and to whom priority is given to one or several traffic lights in a single route or several linked or dispersed lines. The technology would allow the signal or signals in the next destination/destination to clear all queues in advance and prepare the signal action in advance depending on possible actions received from the signal decision unit.

The present technology reveals a smart signal screen as well where it can adopt multiple possibilities of displays like circled color, number, arrow, word, instructions, and timer separately or together. This will help also in the security aspect where the movement of the car can be tracked and proactively know what the next destination is. As known, most light signals are bonded to static directions and in case of emergencies or other situations the diversion of the cars to different lanes is done mostly manually, where with this idea the traffic light can take action in such scenarios and moreover it could also stop or hold or divert vehicles going to reach the signal even after 4 KM or whatsoever. The light signal can display multiple directions on one single screen or multiple dynamic direction on the lane screen depending on the message recieved from decision unite. The present technology has the usage of dynamic, fine-grained traffic information captured using sensors as input and the usage of state-of-the-art real-time object detection algorithms to count the vehicles and real-time image classification algorithm which can work on nuance differences of images with high accuracy to identify priority vehicles. The present technology uses Graph-based Link Analysis and an Unsupervised ML algorithmic approach to capture the dynamic relationship between different nodes in a network of lanes and junctions.

Graph Representation: The road network can be represented as a directed graph. Intersections and endpoints are the nodes, and roads are the edges connecting these nodes. The direction of an edge would represent the allowable direction of travel on that road.

Weight Assignment: Weights are assigned to the edges. Edges are weighted based on the following factors: road capacity, average speed, historical traffic data, time of the day and real-time traffic conditions.

Implementation: the PageRank algorithm is applied to this graph. The algorithm will iteratively calculate a score for each node (intersection/endpoint), which represents the likelihood of a 'traveller' being at that node at any given time, under random travel conditions.

Results: The nodes (intersections/endpoints) with higher scores are those that are more central or crucial in your road network, indicating high traffic flow or importance in connectivity.

Traffic Analysis and Management: These scores are used as weights for each junction in the Reinforcement Learning model. This information is useful for traffic management.

Dynamic Adjustments: This model is further refined by incorporating dynamic factors, such as real-time traffic data, to update weights and rerun the PageRank algorithm periodically. This helps in understanding changing traffic patterns over time. The updated weights are passed back to SARSA Reinforcement Learning Model.

Traffic flow is a real-time dynamic process with many variables. Traffic flow is not only determined by the current spatial dimensions but also by what is happening in interconnected roads. Traffic flow is also a recursive process, where similar underlying computations need to be performed repetitively in space and time. An ideal traffic control system preferably accounts for these multiscale, recursive dependencies.

Traffic flow along a map is a phenomenon that naturally lends itself to network/graph analytics. A dominant method of network analysis called 'Pagerank' is utilized. Pagerank looks at the connections between nodes of a graph and calculates a rank for how important each node is in the network (termed centrality of a node). Here, importance would be a function of the interconnectedness of the road network as well as traffic volume. This allows identification of important junctions and roads that can help route traffic, with a higher density of traffic corresponding to a state where that signal is to be green for a longer time. Because of the recursive spatial quality of PageRank, it can capture the spread of traffic volume through the entire network.

Pagerank is also used to help organically identify the importance of different road sub-networks in a much larger network. This importance/centrality measurement is used as a weight in the SARSA Reinforcement Learning model along with other parameters.

Figure 14:
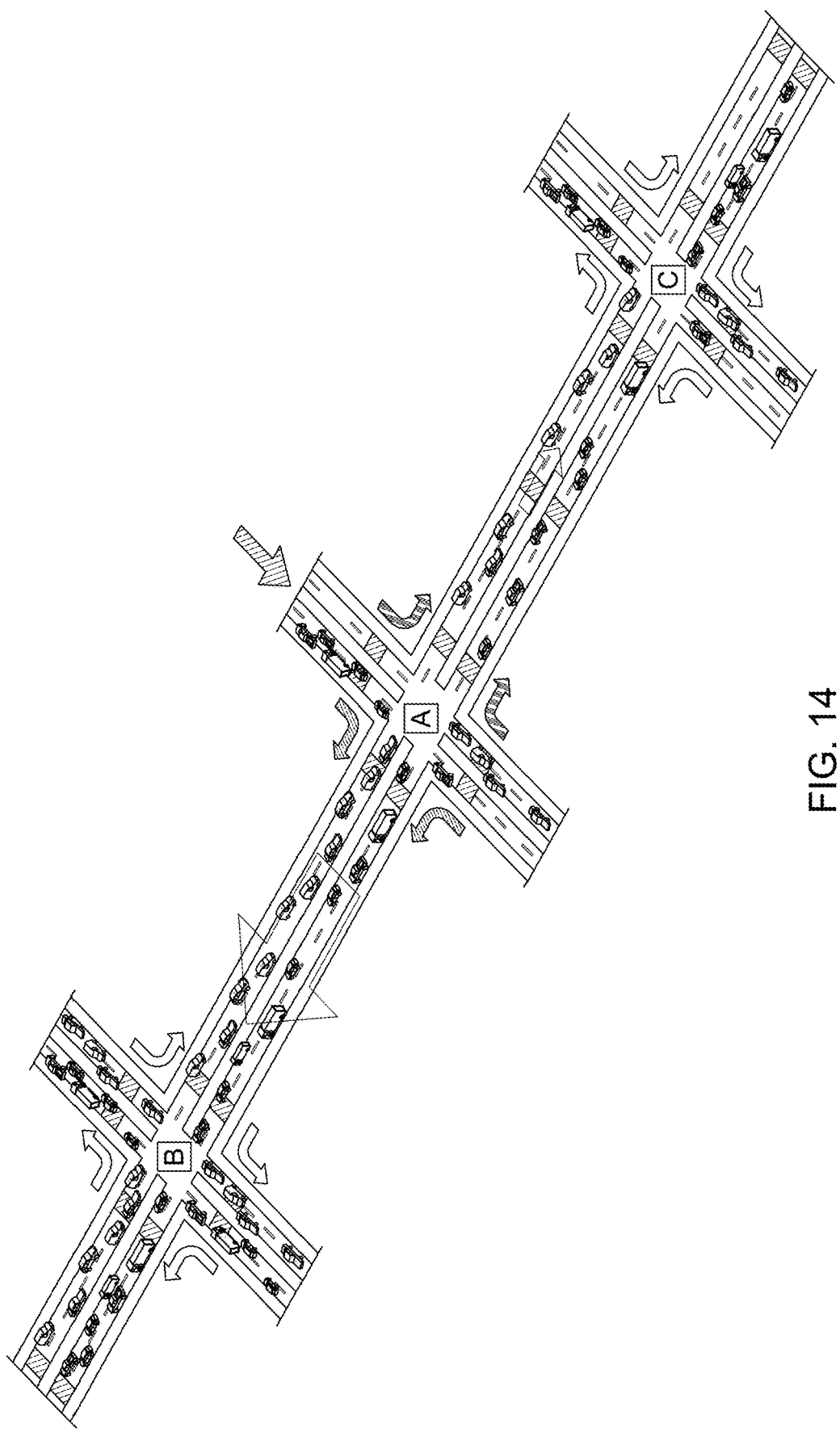
FIG. 14 shows model junctions and the application of weights obtained from a PageRank algorithm at one of the junctions.

FIG. 14 shows the application of the weights obtained from the PageRank algorithm at one of the junctions. Start following traffic from the yellow arrow going into junction A. The traffic on the right turn leads to Junction B and the left turn leads to Junction C. Junction B is assumed to have higher centrality/importance than C. Hence at junction A, it makes more sense to route traffic more towards junction B as more traffic naturally travels towards B than junction C and this will be reflected by making the right turn green for a longer time than the left turn. Such patterns work across the traffic network and are dependent on the time of the day as this is one of the parameters considered in building the algorithm.

A Deep Reinforcement Learning algorithm learns to predict lane signal output at each junction granularly. The present technology provides multi-state output per lane which provides directions and speed recommendations. No other solution fully utilizes, let alone combines the two unique approaches to generate fine-grained intelligent, dynamic, output.

Numerous modifications and variations of the present disclosure are possible in light of the above teachings. It is therefore to be understood that within the scope of the appended claims, the invention may be practiced otherwise than as specifically described herein.

The invention claimed is:

1. A method for managing operation of a traffic signal terminal based on traffic flow of vehicles in the proximity of the traffic signal terminal, the method comprising:
   obtaining real-time vehicle data from a vehicle detection sensor unit;
   determining, based on the real-time vehicle data, lane data associated with each traffic signal terminal of a set of traffic signal terminals, wherein the lane data includes: (a) an effective number of vehicles at a traffic signal terminal on a lane, (b) lane fill data that is indicative of a percentage of a lane occupied by vehicles at a location where a traffic signal terminal of the set of traffic signal terminals is installed, (c) lane fill rate that is indicative of a rate at which the lane is filled with vehicles, and (d) vehicle priority data that is indicative of whether a vehicle is a priority vehicle, wherein the lane data is obtained for each lane of multiple lanes at the location, and wherein the set of traffic signal terminals includes a first traffic signal terminal of multiple traffic signal terminals in a traffic grid and related traffic signal terminals, which correspond to those of the traffic signal terminals related to the first traffic signal terminal;
   obtaining, from a data storage system, traffic flow data that is indicative of traffic flow between the traffic signal terminals at various time intervals;
   generating a first traffic signal message based on the lane data and the traffic flow data, wherein the first traffic signal message includes for each lane: (a) lane speed data that is indicative of a speed limit to be followed in the lane, (b) lane direction data that is indicative of a direction in which vehicular traffic on the lane has to move, or (c) lane traffic signal color;
   transmitting the first traffic signal message to the first traffic signal terminal to cause the first traffic signal terminal to display the first traffic signal message; and
   training a first machine learning (ML) model using training data to generate the first traffic signal message, wherein the training data includes lane data associated with the set of traffic signal terminals, and the traffic flow data associated with the traffic grid.

2. The method of claim 1 further comprising:
   determining the lane data or the traffic flow data after a specified time interval, and
   generating a second traffic signal message after the specified time interval, wherein the lane direction data in the second traffic signal message is indicative of a second direction in which the vehicular traffic on the lane has to move, and wherein the second direction is different from the direction indicated in the first traffic signal message.

3. The method of claim 1, wherein the first ML model uses a cost function that is indicative of a reward assigned to the first ML model based on a wait time of the vehicular traffic at the first traffic signal terminal.

4. The method of claim 3, wherein the cost function includes an additional reward that is assigned to the first ML model for reducing the wait time of a priority vehicle.

5. The method of claim 4, wherein the additional reward assigned for the first ML model is greater than the reward awarded for reducing the wait time of a non-priority vehicle.

6. The method of claim 3, wherein the first ML model is iteratively trained to increase the cost function.

7. The method of claim 1, wherein obtaining the real-time vehicle data includes:
obtaining, using a visual sensor unit of the vehicle detection sensor unit, an image of a vehicle approaching the location of the first traffic signal terminal; and
inputting the image to a second ML model to generate vehicle data upon detection of the vehicle in the image, wherein the vehicle data is indicative of a class of the vehicle and the vehicle priority data.

8. The method of claim 7 further comprising:
determining an effective count of the vehicle by comparing a size of the class of the vehicle to a size of a specified class of a vehicle; and
aggregating the effective count of the vehicles detected at the first traffic signal terminal in a specified time interval to determine the effective number of the vehicles.

9. The method of claim 1, wherein determining the lane data includes:
determining the lane fill data of the lane based on the effective number of the vehicles and a lane capacity of the lane.

10. The method of claim 1, wherein the related traffic signal terminals include those of the traffic signal terminals (i) from which vehicular traffic flows towards the first traffic signal terminal, or (ii) to which the vehicular traffic flows from the first traffic signal terminal.

11. The method of claim 1, wherein determining the traffic flow data includes:
generating a representation of the traffic grid as a directed graph of nodes and links, wherein each of the nodes represents a specified traffic signal terminal of the traffic grid and wherein each of the links between a pair of nodes represents (a) a path for traffic flow between traffic signal terminals corresponding to the pair of nodes and (b) a direction of the traffic flow;
determining link strength for each of the links between the nodes corresponding to the set of traffic signal terminals, wherein the link strength is indicative of the effective number of vehicles passing between two traffic signal terminals, and
determining centrality of each of the nodes corresponding to the set of traffic signal terminals based on the link strength, wherein the centrality is indicative of a weight associated with each of the nodes.

12. The method of claim 11 further comprising: inputting the link strength and the centrality associated with the set of traffic signal terminals as part of training data to the first ML model to generate predicted traffic signal message.

13. The method of claim 1 further comprising:
generating the first traffic signal message based on an event, wherein the event includes expiry of a time interval, wait time of a priority vehicle at the first traffic signal terminal or a related traffic signal terminal exceeding a first specified time limit, wait time of any of the vehicles at the first traffic signal terminal or the related traffic signal terminal exceeding a second specified time limit, or lane fill data associated with first traffic signal terminal or the related traffic signal terminal exceeding a specified threshold limit.

14. A method for managing operation of a traffic signal terminal based on traffic flow of vehicles in the proximity of the traffic signal terminal, the method comprising:
obtaining training data for training a machine learning (ML) model to generate traffic signal message for transmission to a first traffic signal terminal of multiple traffic signal terminals in a traffic grid, wherein obtaining the training data includes:
determining, based on real-time vehicle data input obtained from a vehicle detection sensor unit, lane data associated with each traffic signal terminal of a set of traffic signal terminals, wherein the lane data includes (a) lane fill data that is indicative of a percentage of a lane occupied by vehicles at a location where a traffic signal terminal of the set of traffic signal terminals is installed, and (b) lane fill rate that is indicative of a rate at which the lane is filled with vehicles, wherein the lane data is obtained for each lane of multiple lanes at the location, and wherein the set of traffic signal terminals includes the first traffic signal terminal and related traffic signal terminals, which correspond to those of the traffic signal terminals related to the first traffic signal terminal, and
obtaining, from a data storage system, traffic flow data that is indicative of traffic flow between the traffic signal terminals at various time intervals; and
training the ML model with the training data to generate the traffic signal message, wherein the traffic signal message includes, for each lane: (a) lane speed data that is indicative of a speed limit to be followed on the lane, (b) lane direction data that is indicative of a direction in which vehicular traffic on the lane has to move, or (c) lane traffic signal color.

15. The method of claim 14, wherein the ML model uses a cost function that is indicative of a reward assigned to the ML model based on a wait time of the vehicular traffic at the first traffic signal terminal, and wherein the ML model is iteratively trained to increase the cost function.

16. The method of claim 14, wherein determining the lane data includes:
generating vehicle data upon detection of a vehicle in the real-time vehicle data, wherein the vehicle data is indicative of a class of the vehicle,
determining an effective number of the vehicles based on the class of each of multiple vehicles detected, and
determining the lane fill data based on the effective number of the vehicles and a lane capacity of the lane.

17. The method of claim 14, wherein obtaining the traffic flow data includes:
generating a representation of the traffic grid as a directed graph of nodes and links, wherein each of the nodes represents a specified traffic signal terminal of the traffic grid and wherein each of the links between a pair of nodes represents (a) a path for traffic flow between traffic signal terminals corresponding to the pair of nodes and (b) a direction of the traffic flow,
determining link strength for each of the links between the nodes corresponding to the set of traffic signal terminals, wherein the link strength is indicative of an effective number of vehicles passing between two traffic signal terminals,
assigning a weight to each of the nodes corresponding to the set of traffic signal terminals based on the link strength, and inputting the link strength and the weight associated with the set of traffic signal terminals as part of the training data to the ML model.

18. The method of claim 14 further comprising:
obtaining the real-time vehicle data from the vehicle detection sensor unit at a specified time;
determining lane data of the set of traffic signal terminals based on the real-time vehicle data;
inputting the lane data and the traffic flow data to the ML model to generate predicted traffic signal message; and
transmitting the predicted traffic signal message to the first traffic signal terminal to cause the first traffic signal terminal to display the predicted traffic signal message.

19. A non-transitory computer-readable storage medium for storing computer-readable instructions that, when executed by a computer, cause the computer to perform a method, the method comprising:
determining lane data associated with each traffic signal terminal of a set of traffic signal terminals, wherein the lane data includes (a) lane fill data that is indicative of a percentage of a lane occupied by vehicles at a location where a traffic signal terminal of the set of traffic signal terminals is installed, and (b) lane fill rate that is indicative of a rate at which the lane is filled with vehicles, wherein the lane data is obtained for each lane of multiple lanes at the location, and wherein the set of traffic signal terminals includes a first traffic signal terminal of multiple traffic signal terminals in a traffic grid and those of the traffic signal terminals related to the first traffic signal terminal;
obtaining, from a data storage system, traffic flow data that is indicative of traffic flow between the traffic signal terminals at various times;
generating, based on the lane data and the traffic flow data, a traffic signal message for the first traffic signal terminal, wherein the traffic signal message includes, for each lane: (a) lane speed data that is indicative of a speed limit to be followed in the lane, (b) lane direction data that is indicative of a direction in which vehicular traffic on the lane has to move, or (c) lane traffic signal color;
transmitting the traffic signal message to the first traffic signal terminal to cause the first traffic signal terminal to display the traffic signal message; and
training a first machine learning (ML) model using training data to generate the traffic signal message, wherein the training data includes lane data associated with the set of traffic signal terminals, and the traffic flow data associated with the traffic grid.

\* \* \* \* \*